(12) United States Patent
Frenne et al.

(10) Patent No.: US 11,184,913 B2
(45) Date of Patent: Nov. 23, 2021

(54) NODE AND METHOD FOR DOWNLINK COMMUNICATIONS SCHEDULING

(71) Applicant: Telefonaktiebolaget LM Ericsson (publ), Stockholm (SE)

(72) Inventors: Mattias Frenne, Uppsala (SE); Daniel Larsson, Vallentuna (SE); Lars Lindbom, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1008 days.

(21) Appl. No.: 15/224,149

(22) Filed: Jul. 29, 2016

(65) Prior Publication Data
US 2016/0338093 A1 Nov. 17, 2016

Related U.S. Application Data

(63) Continuation of application No. 13/981,847, filed as application No. PCT/SE2013/000065 on May 18, 2013, now abandoned.
(Continued)

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0007* (2013.01); *H04L 5/0053* (2013.01);
(Continued)

(58) Field of Classification Search
CPC ... H04L 5/0078; H04L 5/0007; H04L 5/0053; H04W 72/0446; H04W 72/1289; H04W 76/046; H04W 76/27; H04W 72/042
(Continued)

(56) References Cited

U.S. PATENT DOCUMENTS 9,198,181 B2 11/2015 Blankenship et al.
9,231,742 B2 * 1/2016 Dinan ............... H04W 72/0406
(Continued)

FOREIGN PATENT DOCUMENTS

WO 2011085192 A1 7/2011

OTHER PUBLICATIONS

Lee et al., "Enhanced Physical Control Channel Operation for LTE-Advanced", Mar. 1, 2012, U.S. Appl. No. 61/605,744, pp. 1-8.*
(Continued)

*Primary Examiner* — Shah M Rahman
(74) *Attorney, Agent, or Firm* — Murphy, Bilak & Homiller, PLLC

(57) ABSTRACT

Example embodiments presented herein are directed towards a base station and corresponding method for scheduling a downlink broadcast transmission using PDSCH. The base station is also configured to provide an OFDM PDSCH to a wireless terminal, which monitors ePDCCH for receiving downlink control data. Thus, by applying such a symbol, a wireless terminal that monitors ePDCCH and a wireless terminal that monitors PDCCH may receive the same downlink broadcast transmission on PDSCH. Example embodiments are also directed towards a wireless terminal for receiving such downlink broadcast transmissions.

25 Claims, 16 Drawing Sheets

Related U.S. Application Data

(60) Provisional application No. 61/645,653, filed on May 11, 2012.

(51) Int. Cl.
  *H04W 76/27* (2018.01)
  *H04W 72/04* (2009.01)

(52) U.S. Cl.
  CPC ....... *H04L 5/0078* (2013.01); *H04W 72/0446* (2013.01); *H04W 76/27* (2018.02)

(58) Field of Classification Search
  USPC .......................................................... 370/329
  See application file for complete search history.

(56) References Cited

U.S. PATENT DOCUMENTS

| | | | |
|---|---|---|---|
| 9,674,829 B2 | 6/2017 | Kim et al. | |
| 2009/0316630 A1 | 12/2009 | Yamada et al. | |
| 2010/0195599 A1* | 8/2010 | Zhang | H04L 5/0053 370/329 |
| 2011/0044391 A1 | 2/2011 | Ji et al. | |
| 2011/0075624 A1 | 3/2011 | Papasakellariou et al. | |
| 2011/0274066 A1* | 11/2011 | Tee | H04L 5/001 370/329 |
| 2012/0069790 A1 | 3/2012 | Chung et al. | |
| 2012/0069795 A1 | 3/2012 | Chung et al. | |
| 2012/0076103 A1 | 3/2012 | Dai et al. | |
| 2012/0106465 A1* | 5/2012 | Haghighat | H04W 72/1289 370/329 |
| 2012/0218952 A1 | 8/2012 | Kwon et al. | |
| 2012/0263127 A1 | 10/2012 | Moon et al. | |
| 2012/0282936 A1 | 11/2012 | Gao et al. | |
| 2013/0039284 A1 | 2/2013 | Marinier et al. | |
| 2013/0044676 A1* | 2/2013 | Kim | H04L 1/1607 370/315 |
| 2013/0064119 A1 | 3/2013 | Montojo et al. | |
| 2013/0083753 A1 | 4/2013 | Lee et al. | |
| 2013/0094458 A1* | 4/2013 | Sartori | H04W 72/042 370/329 |
| 2013/0107855 A1 | 5/2013 | Takeda et al. | |
| 2013/0183987 A1 | 7/2013 | Vrzic et al. | |
| 2013/0201936 A1 | 8/2013 | Chen et al. | |
| 2013/0272215 A1* | 10/2013 | Khoryaev | H04W 28/02 370/329 |
| 2014/0036853 A1 | 2/2014 | Kim et al. | |
| 2014/0050191 A1 | 2/2014 | Kim et al. | |
| 2014/0086202 A1 | 3/2014 | Nagata et al. | |
| 2014/0133346 A1* | 5/2014 | Kang | H04W 24/10 370/252 |
| 2014/0133371 A1 | 5/2014 | Park et al. | |
| 2014/0133433 A1* | 5/2014 | Ahn | H04W 74/002 370/329 |
| 2014/0153539 A1* | 6/2014 | Seo | H04L 5/0053 370/330 |
| 2014/0185539 A1* | 7/2014 | Seo | H04B 7/2656 370/329 |
| 2014/0247816 A1 | 9/2014 | Kim et al. | |
| 2014/0362758 A1* | 12/2014 | Lee | H04L 5/0037 370/312 |
| 2015/0043468 A1 | 2/2015 | Seo | |
| 2015/0078285 A1 | 3/2015 | Kim et al. | |

OTHER PUBLICATIONS

Seo et al., "Methods for Setting Starting Position of Control Channels and Data Channels", Nov. 2, 2012, U.S. Appl. No. 61/554,965, pp. 1-23.*

Moon, Sungho, "Key Issues of 3GPP LTE-Advanced", LG Electronics, 4G Technical Research Gr. MCRL, Jun. 21, 2010, 2, 19-26.

Unknown, Author, "Discussion on ePDCCH Design Issues." Samsung. R1-112517. 3GPP TSG-RAN1 #66 Meeting. Aug. 22-26, 2011. Athens, Greece.

Unknown, Author, "UE Behaviors According to Search Space Configuration." LG Electronics. R1-113993. 3GPP TSG Ran WG1 Meeting #67. Nov. 14-18, 2011. San Francisco, US.

Unknown, Author, "On Downlink Control Signalling Enhancement", 3GPP TSG Ran WG1 Meeting #66, R1-112219, Intel Corporation, Athens, Greece, Aug. 22-26, 2011, pp. 1-4.

Unknown, Author, "PDCCH Enhancement Considerations", 3GPP TSG Ran WG1 Meeting #65, R1-111661, Research in Motion/UK Limited, Barcelona, Spain, May 9-13, 2011, pp. 1-4.

Seo, Dongyoun, et al., "Flexible TDD Subframe Uplink-Downlink Configuration", U.S. Appl. No. 61/271,703, filed Apr. 5, 2011, 1-23.

Unknown, Author, "On RRC signaling for POSCH starting position indication", Fujitsu, 3GPP TSG-Ran WG1 Meeting #62bis, R1-105678, Xi'an, P.R.China, Oct. 11-15, 2010, 1-2.

Ahn, et al., "Method of Supporting Small Bandwidth UEs", U.S. Appl. No. 61/508,071, filed Jul. 2011, 1-18.

Unknown, Author, "Bandwidth reduction for low cost MTC UE and text proposal", Huawei, HiSilicon, CMCC, 3GPP TSG Ran WG 1#68, R1-120051 Dresden, Germany, Feb. 6-10, 2012, 1-9.

Unknown, Author, "Review of approaches for bandwidth reduction for low complexity MTC LTE UEs", IPWireless Inc., 3GPP TSG Ran WG1 Meeting #67, R1-114267, San Francisco, USA, Nov. 14-18, 2011, 1-5.

Xu, et al., "Randeom Access Channel Design for Narrow Bandwith Operation in a Wide Bandwidth System", U.S. Appl. No. 61/542,000, filed Sep. 2011, 1-19.

Seo, Dongyoun, et al., "Methods for Setting Starting Position of Control Channels and Data Channels", U.S. Appl. No. 61/554,965, filed Nov. 2, 2011, 1-23.

Vrzic, et al., "E-PDCCH Design for Reducing Blind Decoding", U.S. Appl. No. 61/587,004, filed Jan. 16, 2012, pp. 1-87.

* cited by examiner

NODE AND METHOD FOR DOWNLINK COMMUNICATIONS SCHEDULING

TECHNICAL FIELD

Example embodiments presented herein are directed towards a base station, and corresponding methods therein, for providing an Orthogonal Frequency Division Multiplexing (OFDM) Physical Downlink Shared Channel (PDSCH) start symbol for a wireless terminal which monitors an enhanced Physical Downlink Control Channel (ePDCCH) for obtaining downlink control data. Example embodiments are also presented for the wireless terminal, and corresponding methods therein, for obtaining the OFDM PDSCH start symbol and for receiving downlink broadcast transmissions based on the OFDM PDSCH start symbol.

BACKGROUND

Long Term Evolution Systems

Long Term Evolution (LTE) uses Orthogonal Frequency Division Multiplexing (OFDM) in the downlink direction and a Discrete Fourier Transform (DFT)-spread OFDM in the uplink direction. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions may be organized into radio frames of 10 ms, with each radio frame consisting of ten equally-sized subframes of length Tsubframe=1 ms, as illustrated in FIG. 2.

Furthermore, the resource allocation in LTE is typically described in terms of resource blocks, where a resource block corresponds to one slot (0.5 ms) in the time domain and 12 subcarriers in the frequency domain. Resource blocks are numbered in the frequency domain, starting with 0 from one end of the system bandwidth.

Downlink transmissions are dynamically scheduled, i.e., in each subframe the base station transmits control information about to which user equipments data is transmitted and upon which resource blocks the data is transmitted, in the current downlink subframe. This control signaling is typically transmitted in the first 1, 2, 3 or 4 OFDM symbols in each subframe. The number 1, 2, 3 or 4 is known as the Control Format Indicator (CFI) indicated by the Physical CFI Channel (PCHICH) transmitted in the first symbol of the control region. The control region also comprises Physical Downlink Control Channels (PDCCH) and possibly Physical HARQ Indication Channels (PHICH) carrying ACK/NACK for uplink transmissions. The region of the remaining 14-n OFDM symbols in the subframe is denoted the shared data channel region and it comprises the Physical Downlink Shared Channel (PDSCH).

The downlink subframe also comprises Common Reference Symbols (CRS), which are known to the receiver and used for coherent demodulation of, for example, the control information. A downlink system with CFI=3 OFDM symbols as control is illustrated in FIG. 3. The PDCCH is used to carry downlink control information (DCI) such as scheduling decisions and power-control commands.

More specifically, the DCI comprises downlink scheduling assignments. The downlink scheduling assignments comprise PDSCH resource indication, transport format, hybrid-ARQ information, and control information related to spatial multiplexing (if applicable). A downlink scheduling assignment also comprises a command for the power control of the Physical Uplink Control Channel (PUCCH) used for the transmission of hybrid-ARQ acknowledgements in response to downlink scheduling assignments.

The DCI also comprises uplink scheduling grants. The uplink scheduling grants comprise Physical Uplink Shared Channel (PUSCH) resource indications, transport format information, and hybrid-ARQ-related information. An uplink scheduling grant also comprises a command for the power control of the PUSCH. The DCI further comprises power-control commands for a set of terminals as a complement to the commands comprised in the scheduling assignments/grants.

One PDCCH carries one DCI message with one of the formats described above. As multiple terminals can be scheduled simultaneously, on both downlink and uplink transmissions, there must be a possibility to transmit multiple scheduling messages within each subframe. Each scheduling message is transmitted on a separate PDCCH, and consequently there are typically multiple simultaneous PDCCH transmissions within each cell. Furthermore, to support different radio-channel conditions, link adaptation can be used, where the code rate of the PDCCH is selected to match the radio-channel conditions.

Heterogeneous Networks

Heterogeneous networks have recently attained a large amount of interest within the mobile cellular industry and are regarded by operators and many vendors as the deployment needed to meet high user experiences in mobile broadband. Heterogeneous networks can be characterized as deployments with a mixture of cells of differently sized and overlapping coverage areas. One example of such a network is where pico cells are deployed within the coverage area of a macro cell, as illustrated in FIG. 4. A pico cell is a small cellular base station transmitting with low output power and typically covers a much smaller geographical area than a macro base station.

Heterogeneous networks represent an alternative to the densification of macro networks, and have classically been considered in cellular networks with traffic hotspots as a deployment method for increasing network capacity. In such scenarios, small cells covering the traffic hotspot can off-load the macro cell and thus improve both capacity and the overall data throughput within the coverage area of the macro cell. In emerging mobile broadband applications, there is however a continuous demand for higher data rates and therefore it is of interest to deploy low power nodes, not necessarily to only cover traffic hotspots, but also at locations within the macro cell coverage where the signal-to-noise ratio prevents high data rates.

User equipments (UE) attached to cellular networks continuously monitor which cell they shall be associated with. This monitoring is typically conducted by evaluating the radio reception quality of its serving cell (current association) against radio reception quality of neighbor cells. If the radio reception quality of a neighbor cell is better than the serving cell, a new cell association will be established for the user equipment. In LTE networks, the procedures for changing cell association depend on which of the two RRC states, RRC_IDLE and RRC_CONNECTED, the user equipment is within. In connected mode the user equipment is known by the Radio Access Network (RAN) and cell association decisions are taken by the RAN. The cell association decisions are usually based on mobility measurement reports provided by the user equipment. If a mobility measurement report indicates that the user equipment is better served by a neighbor cell, then the network initiates a handover procedure. Mobility measurement reports refer to measured Reference Signal Received Power (RSRP), or Reference Signal Received Quality (RSRQ), in units of dB.

Depending on how these mobility measurements, possibly complemented by a configurable offset (handover bias or cell reselection offset), are used a user equipment may be connected to the cell with the strongest received power, for example RSRP, the cell with the best path gain, or a combination of the two. These different cell association principles do not typically result in the same selected cell when the base station output powers of cells differ. This is sometimes referred to as link imbalance. For example, the output power of a pico base station is in the order of 30 dBm or less, while a macro base station may have an output power of 46 dBm. Consequently, even in the proximity of the pico cell, the downlink signal strength from the macro cell may be larger than that of the pico cell. From a downlink perspective, it is better to select a cell based on downlink received power, whereas from an uplink perspective, it would be better to select a cell based on the path loss as illustrated in FIG. 5. Hence, in this scenario, it could be more beneficial from a system perspective to connect to the pico cell even if the macro downlink is much stronger than the pico cell downlink. Increasing the coverage of small cells for operations in link imbalance zones may, for example, be done by adding an offset, or a bias, to the RSRP measurements. However, operations with larger offsets, or hand over biases, would require Inter-Cell Interference Coordination (ICIC) across layers, particularly in very highly loaded systems. The link imbalance is sometimes referred to as the cell range expansion zone, as traditionally the cell border is defined by the RSRP with zero offset.

3GPP LTE release 10 specified new ICIC features for enabling reliable operations in the cell range expansion zone of pico users in a connected mode up to offsets of 6 dB, for example, pico cell range of RSRP+6 dB. This new ICIC feature is sometimes referred to as enhanced ICIC and provides specification of signaling support for time domain based ICIC.

A user equipment receiving data has to first detect the physical layer control information in order to know which resource blocks comprises the data intended for that user as well as other information required to demodulate the received data. When to receive downlink data is in general not known in advance so the user equipment needs to monitor the physical layer control transmissions in all subframes.

The principle of time domain ICIC is illustrated in FIG. 6. In the example illustrated in FIG. 6, an interfering macro cell avoids scheduling data to macro users in certain subframes, in order to create protected radio resources for the pico cell. The macro eNB indicates via the LTE backhaul X2 interface to the neighbor pico eNB which subframes it intends to not schedule users within. The pico eNB can then take this information into account when scheduling users operating within the cell range expansion zone; such that these users are prioritized to be scheduled in protected subframes, for example, low interference subframes. Users operating near the pico eNB may in principle be scheduled in all subframes. One may notice that time domain ICIC assumes that pico cells are time synchronized to the macro cell, as a prerequisite for creating protected subframes.

In mobile cellular networks, system information is broadcasted in each cell and comprises information needed for the user equipment to both access the cell and properly operate within cell. In LTE, system information is structured into one Master Information Block (MIB) and thirteen System Information Blocks (SIBs), referring to SIB1 to SIB13. In contrast to the MIB, SIBs are schedulable in both time and frequency (SIB2 to SIB13), or in frequency only (SIB1).

FIG. 7 illustrates where the transmissions of MIB and SIB1 occur in a time synchronized heterogeneous network. As may be observed from this figure, the MIB is transmitted in subframe #0 of the LTE radio frame and the SIB1 is transmitted in subframe #5 of every even radio frame. Another observation from this figure is that the MIB transmission in the macro cell interferes with the MIB transmission in the pico cell. The same holds also for the SIB1 transmissions, but in this case there is a possibility to coordinate data transmissions in the frequency domain. However, the physical layer control signaling of the SIB1 transmissions cannot be coordinated across the macro and the pico cells. Thus, the physical layer control part of the macro SIB1 transmissions will interfere with the corresponding physical control transmissions of SIB1 in the pico cell. As SIB2 to SIB13 transmissions are schedulable in both time and frequency, it is possible ensure that these system information blocks are scheduled in protected subframes only.

A user equipment in RRC_CONNECTED state is notified by its serving base station (eNB) about changes in the system information either via a paging message or via a counter in the SIB1 that is incremented every time the system information has been changed. A user equipment receiving a system change notification via paging acquires system information by first reading the SIB1. Due to potentially very high macro interference towards physical layer broadcast channels carrying MIB and SIB1 for a pico user in the cell range expansion zone, detection of paging messages (sent in cell configured paging occasions), random access responses, or SIB1 transmissions may not be possible.

Random Access

In LTE, as in any communication system, a mobile terminal may need to contact the network (via the eNodeB) without having a dedicated resource in the Uplink (from user equipment to base station). To handle this, a random access procedure is available where a user equipment that does not have a dedicated UL resource may transmit a signal to the base station. The first message of this procedure is typically transmitted on a special resource reserved for random access, a Physical Random Access Channel (PRACH). This channel can for instance be limited in time and/or frequency (as in LTE). An example of a random access preamble transmission is illustrated in FIG. 8.

The resources available for PRACH transmissions are provided to the terminals as part of the broadcasted system information in system information block 2 (SIB-2) (or as part of dedicated RRC signaling in case of, for example, handover). The resources comprise a preamble sequence and a time/frequency resource. In each cell, there are 64 preamble sequences available. Two subsets of the 64 sequences are defined, where the set of sequences in each subset is signaled as part of the system information. When performing a (contention-based) random-access attempt, the terminal selects at random one sequence in one of the subsets. As long as no other terminal is performing a random-access attempt using the same sequence at the same time instant, no collisions will occur and the attempt will, with a high likelihood, be detected by the eNodeB.

In LTE, the random access procedure may be used for a number of different reasons. Among these reasons are initial access (e.g., for UEs in the RRC_IDLE state), incoming handover, resynchronization of the UL, scheduling request (e.g., for a UE that has not allocated any other resource for contacting the base station), and positioning. The contention-based random access procedure used in LTE Rel-10 is illustrated in FIG. 9. The user equipment starts the random access procedure by randomly selecting one of the preambles available for contention-based random access. The user equipment then transmits the selected random access preamble on the Physical Random Access Channel (PRACH) to eNodeB in RAN.

The RAN acknowledges any preamble it detects by transmitting a random access response (MSG2) comprising an initial grant to be used on the uplink shared channel, a temporary C-RNTI (TC-RNTI), and a time alignment (TA) update based on the timing offset of the preamble measured by the eNodeB on the PRACH. The MSG2 is transmitted in the DL to the user equipment using the PDSCH and its corresponding PDCCH message that schedules the PDSCH comprises a cyclic redundancy check (CRC) which is scrambled with the RA-RNTI.

ePDCCH

In LTE release 11 discussions, an enhanced PDCCH (ePDCCH) is introduced which is based on user equipment specific reference signals and is localized in frequency as opposed to the PDCCH which spans the whole bandwidth. Hence, a subset of the available RB pairs in a subframe is configured to be used for ePDCCH transmissions.

A benefit of using user equipment specific precoding is that precoding gains may also be achieved for control channels. Another benefit is that different RB pairs for ePDCCH may be allocated to different cells or different points within a cell. Thereby, intercell interference coordination between control channels may be achieved. This frequency coordination is not possible with the PDCCH since the PDCCH spans the whole bandwidth.

FIG. 10 shows an ePDCCH which, similarly to the CCE in the PDCCH, is divided into multiple eCCE and mapped to one of the enhanced control regions, for example, mapped to one PRB pair reserved for ePDCCH transmission. Even if the enhanced control channel enables user equipment specific precoding and such localized transmission as illustrated in FIG. 10, it may in some cases be useful to be able to transmit an enhanced control channel in a broadcasted, wide area coverage fashion. This is useful if the eNB does not have reliable information to perform precoding towards a certain user equipment. Then a wide area coverage transmission is more robust, although the precoding gain is lost.

Another case is when the particular control message is intended for more than one user equipment(s). In this case, user equipment specific precoding cannot be used. An example of this case is the transmission of common control information as in the PDCCH, for example, in the common search space. The transmission of system information blocks (SIB), random access responses and paging will be scheduled from the common search space of the ePDCCH.

In yet another case, sub-band precoding may be utilized. Since the user equipment estimates the channel in each RB pair individually, the eNB can choose different precoding vectors in the different RB pairs, if the eNB has such information that the preferred precoding vectors are different in different parts of the frequency band. In any of these cases, a distributed transmission may be used, as illustrated in FIG. 11, where the eREG belonging to the same ePDCCH are distributed over the enhanced control regions.

A user equipment may be configured to monitor its control channel in the ePDCCH instead of the PDCCH. Hence, both its UE specific search space (USS) and its common search space (CSS) are monitored in the ePDCCH resources. Alternatively, a user equipment may monitor the USS in the ePDCCH and the CSS in PDCCH.

For some user equipment categories in the future, such as low cost machine type communication user equipments (MTC), they don't monitor the PDCCH at all. One reason could be that they have a reduced and user equipment specific reception bandwidth and cannot receive the full system bandwidth, which is required to monitor the PDCCH. Therefore, these user equipments must always monitor CSS and USS in the ePDCCH. For at least these user equipments, initial access to a cell must also be performed directly to ePDCCH. Also, user equipments that are capable of monitoring either or both of PDCCH and ePDCCH may choose to perform initial access using the ePDCCH if it is available in the cell.

SUMMARY

In receiving downlink broadcast transmissions, a user equipment may use a start symbol for the PDSCH that carries the broadcast message. The start symbol aids in identifying the start of downlink broadcast transmissions in a channel. This start symbol may be obtained via downlink control data. As described above, different user equipments may monitor different channels for receiving downlink control data. As a result, the different user equipment may not be able to receive the same broadcast transmission on the same PDSCH channel.

Some of the example embodiments presented herein are directed towards providing a starting OFDM PDSCH start symbol of a PDSCH transmission comprising system information, random access responses or a paging message by means other than using the PCFICH. According to some of the example embodiments, the network may indicate the same configured value in the PCFICH so that user equipments which are unable to read the PCFICH may decode the same message as user equipments that are able to read the PCFICH.

Thus, some of the example embodiments may comprise explicit and dynamic signaling of the OFDM PDSCH start symbol in a DCI message (transmitted via ePDCCH). Some of the example embodiments may comprise semi-static signaling via a RRC message (transmitted via PDSCH). Other example embodiments may comprise a pre-defined and fixed OFDM PDSCH start symbol for PDSCH transmissions.

An example advantage of the example embodiments presented herein is the ability of allowing a user equipment to receive system information, paging and random access responses in cases of high intercell interference on the control channel. A further example advantage is providing reduced control channel overhead.

Accordingly, some of the example embodiments are directed towards a method, in a base station, for scheduling a downlink broadcast transmission using a PDSCH and for providing an OFDM PDSCH start symbol for the broadcast transmissions. The base station is comprised in a wireless communications network. The method comprises providing, to at least one wireless terminal which monitors an ePDCCH for receiving downlink control information, the OFDM PDSCH start symbol. The OFDM PDSCH start symbol is provided in a message transmitted outside of a control region of a subframe, where the control region comprises at least a PDCCH. Alternatively, the OFDM PDSCH start symbol is based on a predefined value.

Some of the example embodiments are directed towards a base station for scheduling a downlink broadcast transmission using a PDSCH and for providing an OFDM PDSCH start symbol for the broadcast transmissions. The base station is comprised in a wireless communications network. The base station comprises processing circuitry configured to provide, to at least one wireless terminal which monitors an ePDCCH for receiving downlink control information, the OFDM PDSCH start symbol. The OFDM PDSCH start value is provided in a message transmitted outside of a control region of the subframe, where the control region comprises at least a PDCCH. Alternatively, the OFDM PDSCH start value is based on a predefined value.

Some of the example embodiments are directed towards a method in a wireless terminal for receiving downlink broadcast transmissions in a PDSCH. The wireless terminal is comprised in a wireless communications network. The method comprises monitoring an ePDCCH for downlink control information. The method further comprises obtaining an OFDM PDSCH start value for downlink broadcast transmissions. The OFDM PDSCH start symbol is provided in a message transmitted outside of a control region of a subframe, where the control region comprises at least a PDCCH. Alternatively, the OFDM PDSCH start symbol is based on a predefined value. The method also comprises receiving downlink broadcast transmissions on the PDSCH based on the OFDM PDSCH start symbol.

Some of the example embodiments are directed towards a wireless terminal for receiving downlink broadcast transmissions in a PDSCH. The wireless terminal is comprised in a wireless communications network. The wireless terminal comprises processing circuitry configured to monitor an ePDCCH for downlink control information. The processing circuitry is also configured to obtain an OFDM PDSCH start symbol for downlink broadcast transmissions. The OFDM PDSCH start value is provided in a message transmitted outside of a control region of a subframe, where the control region comprises at least a PDCCH. Alternatively, the OFDM PDSCH start symbol is based on a predefined value. The wireless terminal further comprises radio circuitry configured to receive downlink broadcast transmissions on the PDSCH based on the OFDM PDSCH start symbol.

BRIEF DESCRIPTION OF THE DRAWINGS

The foregoing will be described in more detail with from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc., in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments. It the following text, it should be appreciated that the term user equipment and wireless terminal may be used interchangeable. Furthermore, it would be appreciated that the terms user equipment and wireless terminal may be interpreted as including any form of communication device.

General Overview

Figure 1:
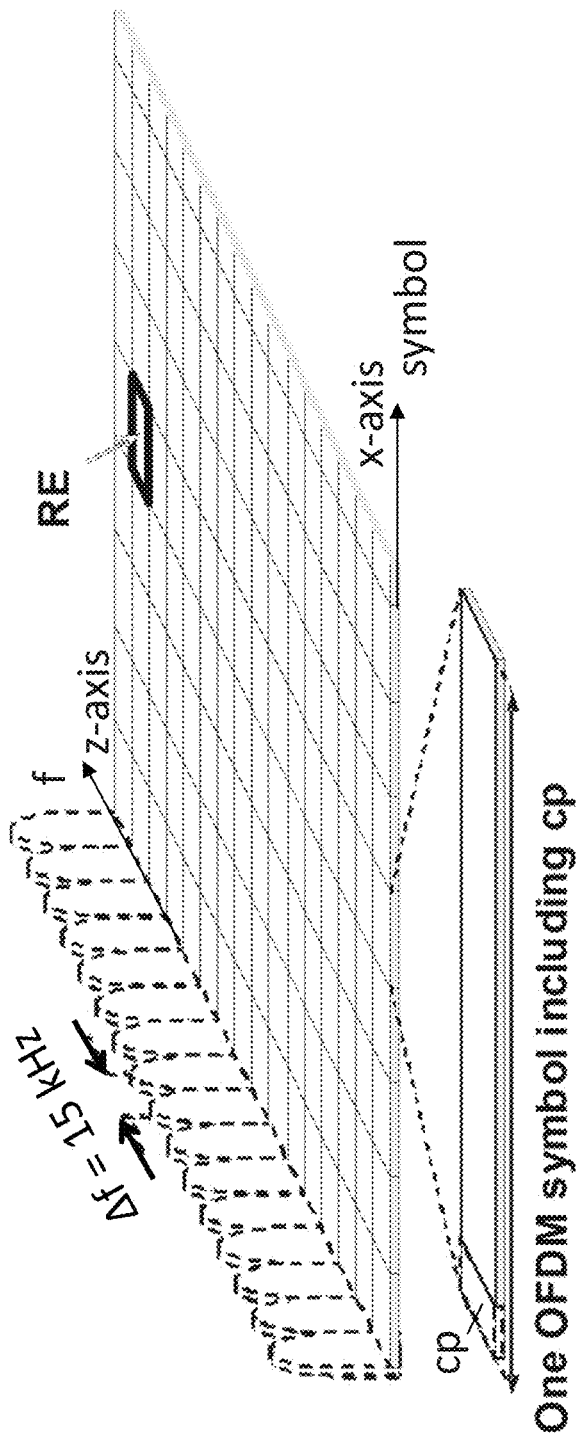
FIG. 1 is an illustrative example of a LTE downlink physical resource.
Figure 2:
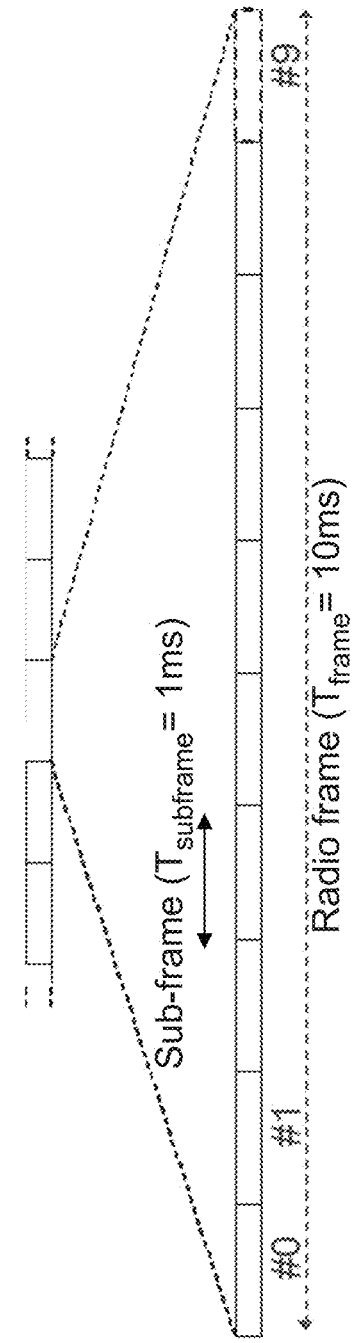
FIG. 2 is a schematic of a LTE time-domain structure.
Figure 3:
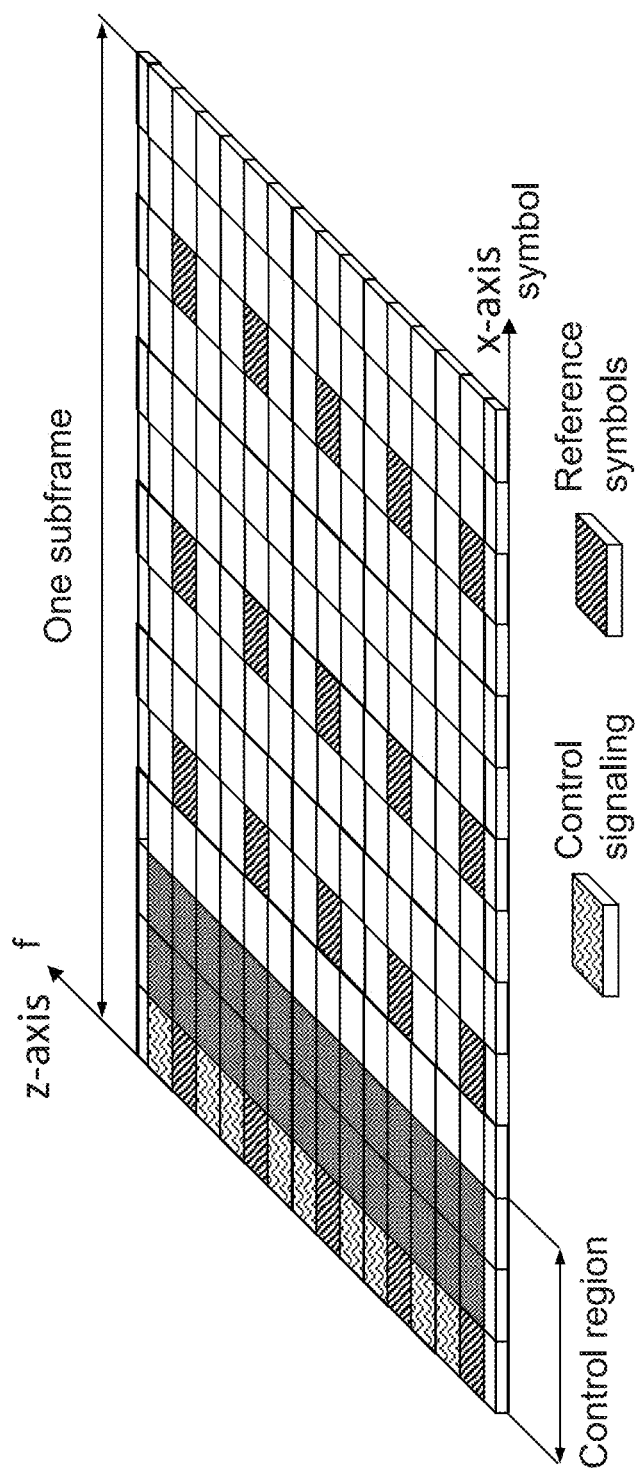
FIG. 3 is a depiction of a downlink subframe.
Figure 4:
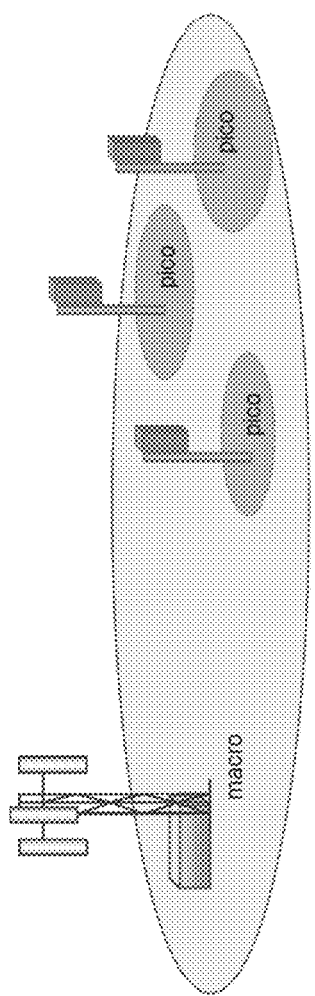
FIG. 4 is an illustrative example of a heterogeneous network with macro and pico cell deployments.
Figure 5:
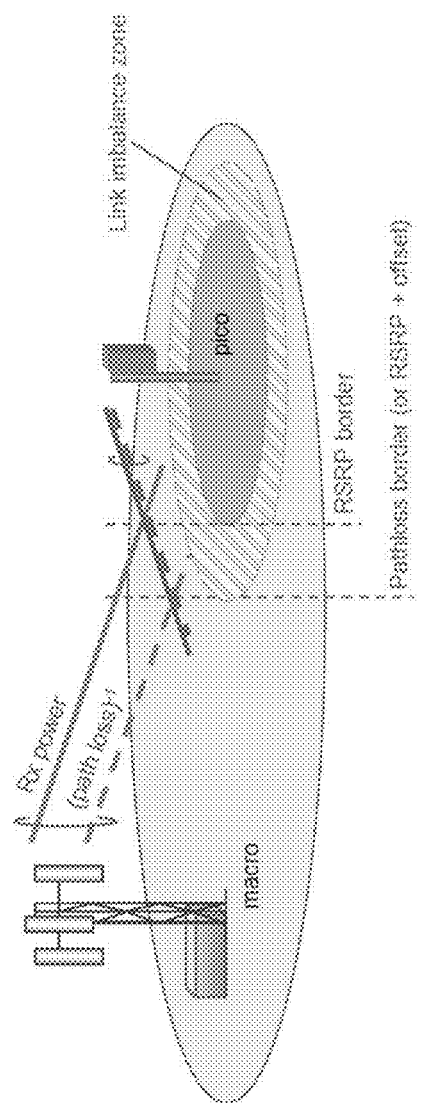
FIG. 5 is an illustrative example of cell association criteria in a heterogeneous network.
Figure 6:
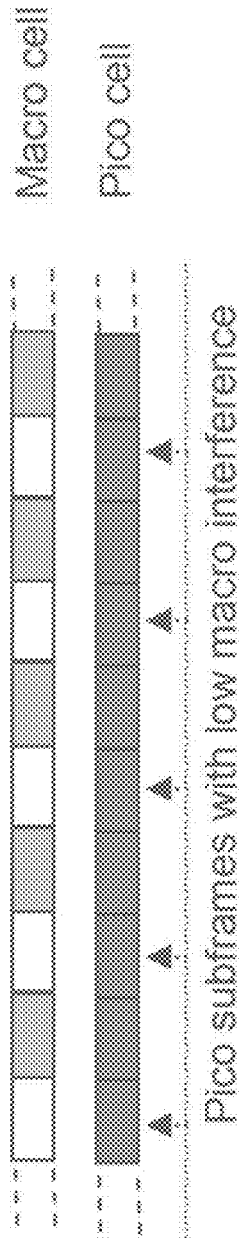
FIG. 6 is a depiction of protected subframes, created by a macro cell, at the pico layer.
Figure 7:
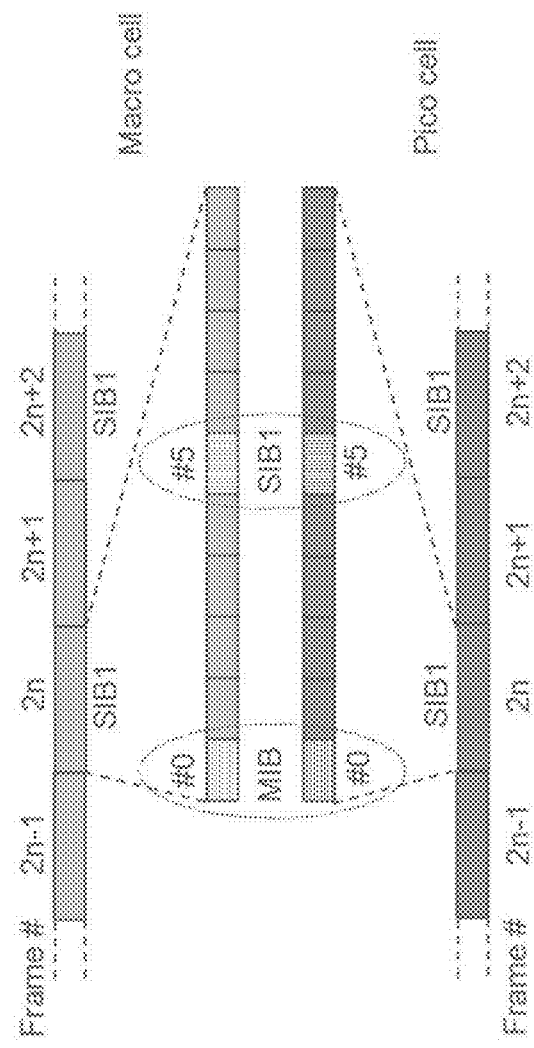
FIG. 7 is an illustrative example of MIB and SIB1 transmissions.
Figure 8:
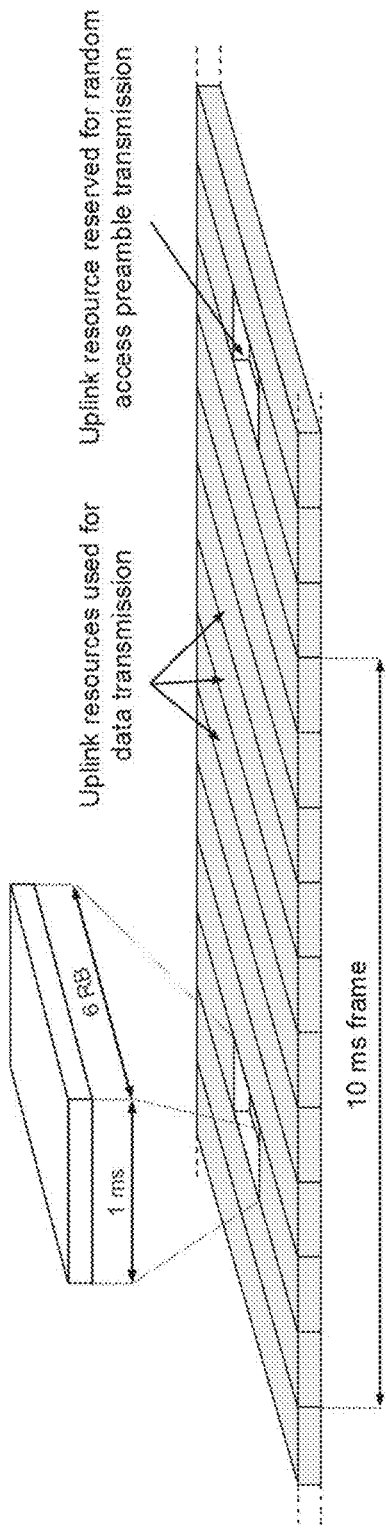
FIG. 8 is a depiction of a random access preamble transmission.

In order to better explain the example embodiments presented herein, a problem will first be identified and discussed. In high interference situations, as is commonly encountered in heterogeneous networks, there is a problem to receive legacy control signals (PDCCH, PCFICH and PHICH), transmitted in the legacy control region, especially when in a cell range expansion zone (or link imbalance zone as illustrated in FIG. 5). A solution to the PDCCH and PHICH reception problems is the introduction of the ePDCCH and ePHICH which are being developed in 3GPP for release 11 and beyond.

In heterogeneous deployments the reception of SIB-1 is in particular problematic as this system information block cannot be scheduled in time. This implies that macro and pico scheduling of the SIB-1 using the related PDCCHs may collide and thus cause severe interference problems for pico cell edge users leading to the SIB-1 being undetectable. Hence, some of the example embodiments also address this scenario by using ePDCCH for broadcasting SIB-1 in CCS for pico cells operating with larger cell range expansion.

When ePDCCH is used, then the OFDM PDSCH start symbol in the subframe may be a user equipment specifically RRC configured parameter to avoid the problem of receiving downlink control information via the PCFICH. This OFDM start symbol is then used for both ePDCCH and PDSCH. Alternatively, if the PCFICH may be used, the OFDM PDSCH start symbol may be dynamically indicated using the PCFICH, for both ePDCCH and PDSCH but this will only be a robust solution for user equipments that may reliably detect PCFICH and hence do not experience the mentioned interference problem.

Figure 12:
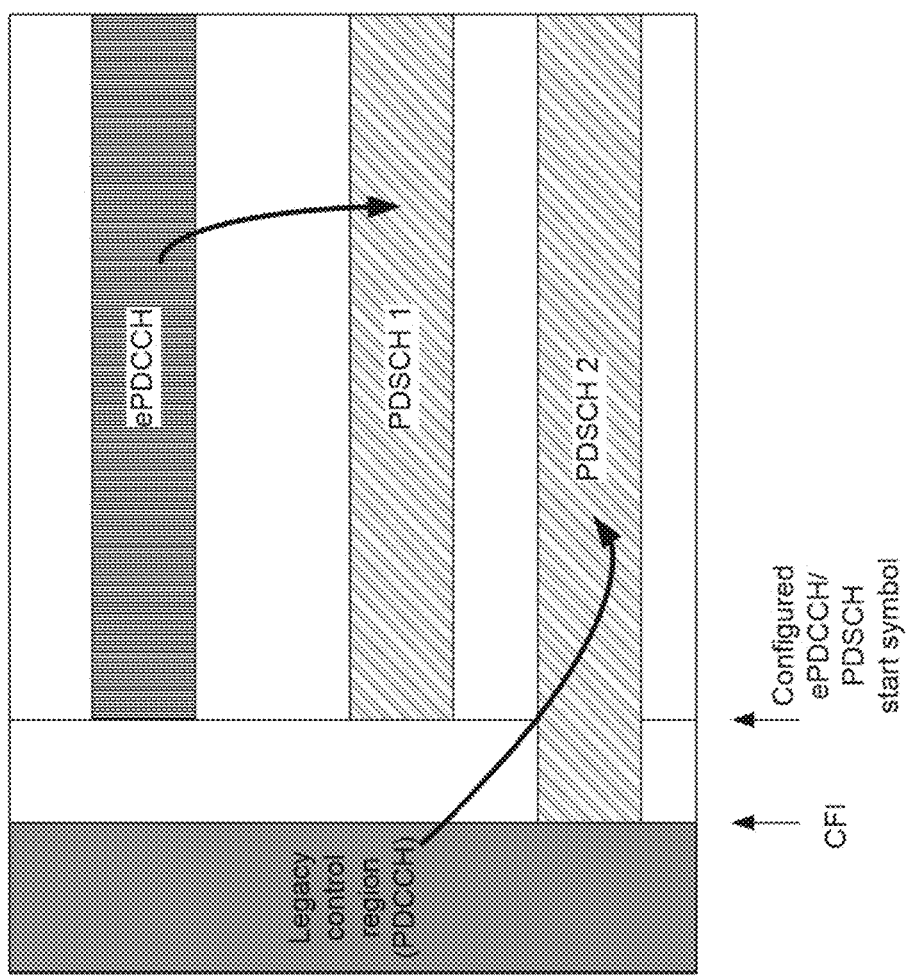
FIG. 12 is an illustrative example of an ePDCCH and PDDCH scheduling.

FIG. 12 illustrates an example where an ePDCCH with a configured start symbol schedules a PDSCH, denoted PDSCH 1. A non-legacy user equipment may use the ePDCCH for receiving downlink control information for receiving downlink broadcast transmissions in PDSCH 1. In the same subframe, another user equipment (e.g., a legacy user equipment or a pre-release 11 user equipment, which does not have support for ePDCCH reception) may receive downlink control information scheduled from the PDCCH for receiving downlink broadcast transmissions from PDSCH 2. The legacy user equipment, which can receive the PCFICH and the PDCCH will follow the start symbol CFI as indicated in the PCFICH. Hence, the two user equipments may have different PDSCH start symbols in the same subframe. It should be noted that the user equipment scheduled using ePDCCH (e.g., the non-legacy user equipment) may have much better coverage than the user equipment scheduled by the PDCCH (e.g., the legacy user equipment) since it does not have the mentioned interference problem in the legacy control region.

The eNB schedules system information blocks (SIB) transmitted by PDSCH by using the PDCCH and the ePDCCH to reach user equipments which monitors the first or the second control channel for such system information. The system information is in 3GPP release 10 broadcasted and scheduled by the PDCCH in the common search space (CSS), with CRC scrambled by SI-RNTI. Since the same PDSCH comprising the SIB is scheduled from both PDCCH and ePDCCH, the OFDM PDSCH start symbol for this PDSCH must be assumed to be the same for both user equipments (e.g., legacy and non-legacy) monitoring PDCCH and ePDCCH, however, such an assumption may not be valid. Furthermore, since the ePDCCH start symbol may be user equipment specifically configured, the two user equipments may have different start symbols configured. This problem is known as start symbol alignment.

Figure 9:
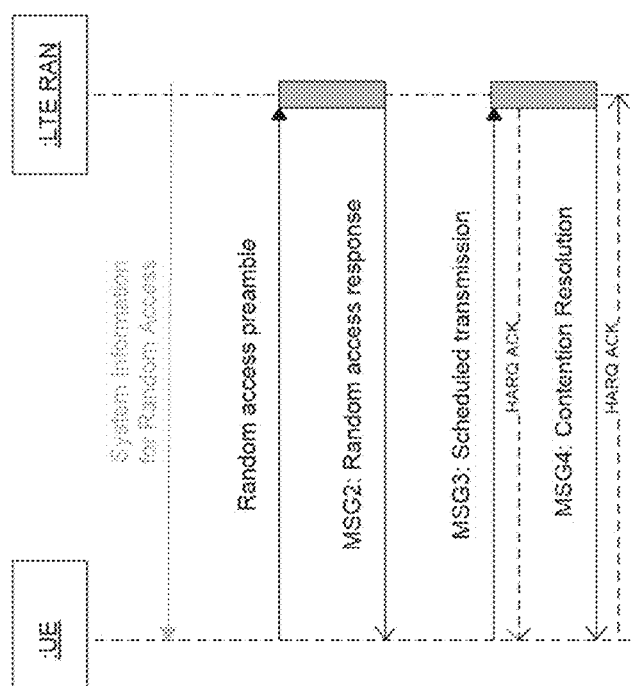
FIG. 9 is a schematic of signaling over an air interface for a contention-based random access procedure in LTE.
Figure 10:
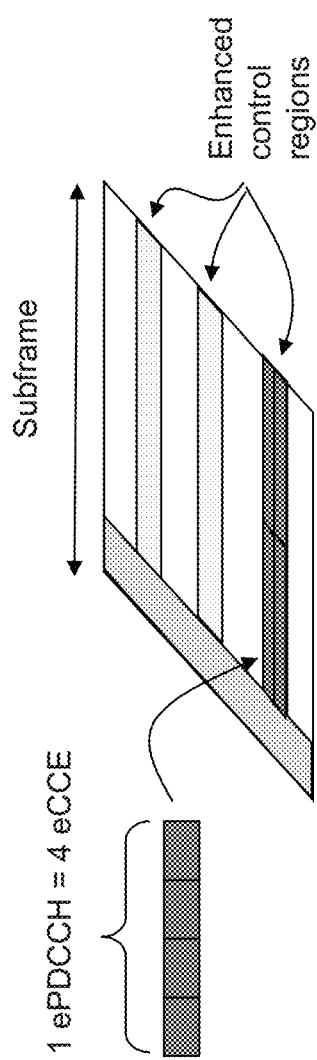
FIGS. 10 and 11 are illustrative examples of CCE mapping in downlink subframes.
Figure 11:
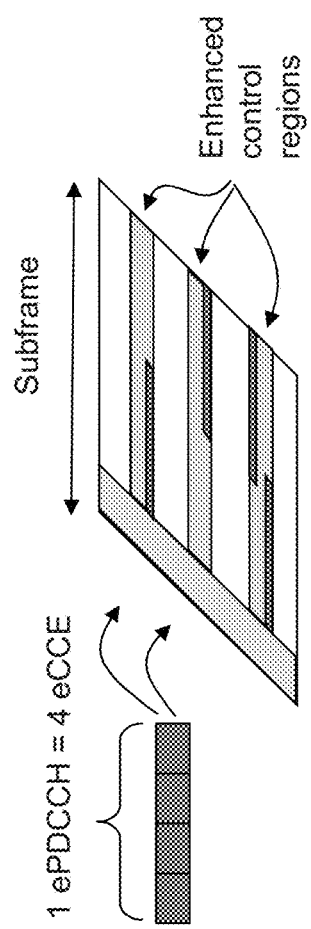

The eNB also schedules a random access response (RAR message 2, FIG. 9), using the RA-RNTI. Which user equipment that transmitted the RA preamble (RAR message 1, FIG. 9) is unknown to the eNB, so it does not know which OFDM start symbol should be used for RAR message 2 (since it is user equipment specifically configured), or if the user equipment follows the start symbol indicated in PCFICH to demodulate the PDSCH. Hence, there is a problem of receiving RA response messages.

In addition, paging transmissions are also broadcasted and comprise a PDSCH that is scheduled through the common search space using P-RNTI. Also user equipments in a RRC_IDLE mode may receive paging messages but in this case, the network does not know which eNB the user equipment is synchronized to. Hence, the network does not know whether the user equipment may reliably detect PCFICH or not, or whether the user equipment monitors the ePDCCH or the PDCCH for P-RNTI transmission. If ePDCCH is used to transmit paging, there is no configuration of an OFDM start symbol for user equipments that are in RRC_IDLE mode. It is thus a problem of how to transmit and receive paging messages.

General Overview of the Example Embodiments

Some of the example embodiments presented herein are directed towards OFDM PDSCH start symbol alignment for all user equipments in a cell. The example embodiments solve at least the above mentioned problems by providing the starting OFDM PDSCH start symbol of the PDSCH transmission comprising system information, random access responses or a paging message by other means than using the PCFICH.

Figure 13:
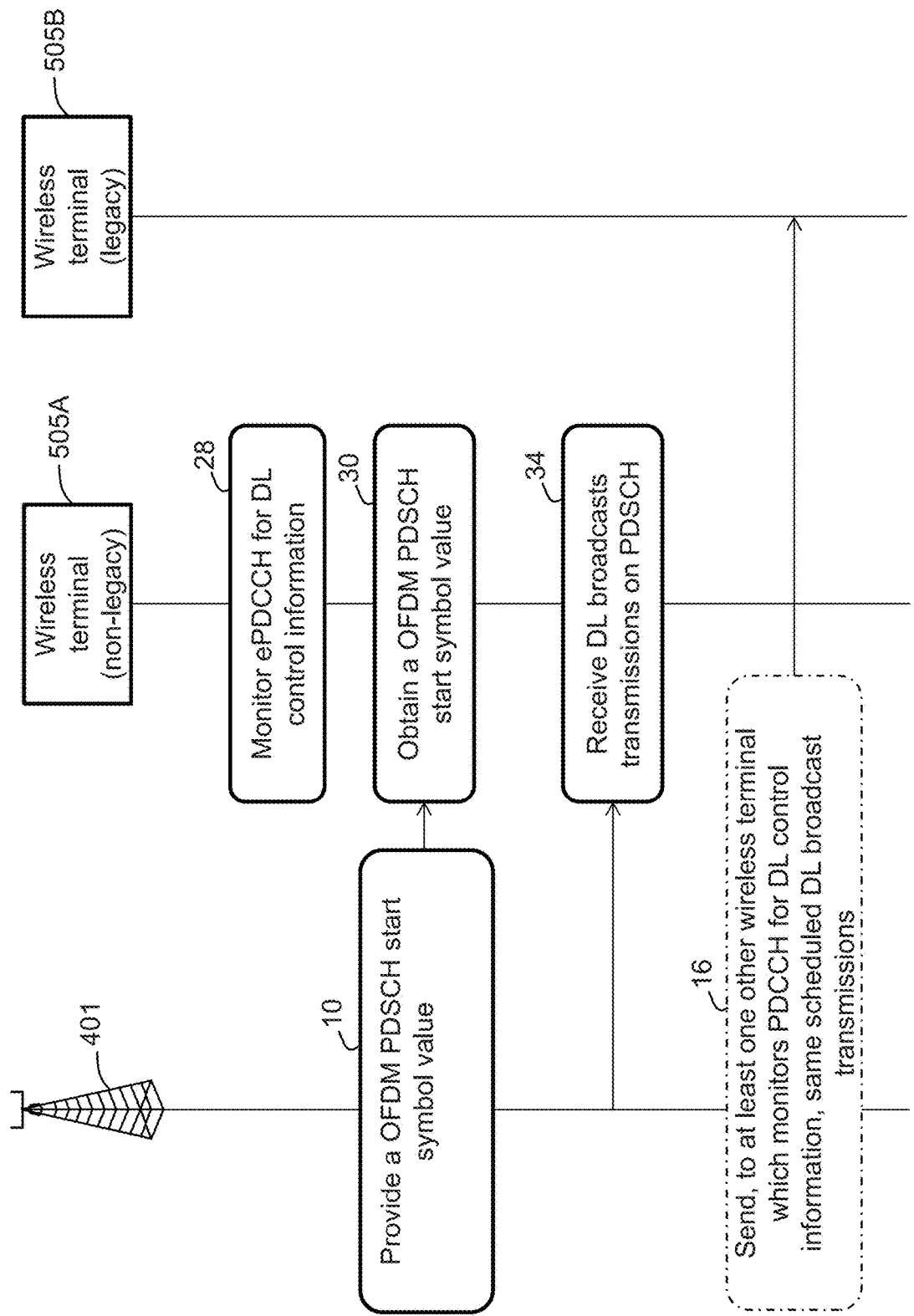
FIG. 13 is a messaging diagram providing an overview of the example embodiments presented herein.

FIG. 13 provides an overview illustration of the example embodiments presented herein. As previously discussed, wireless terminals 505A which monitor ePDCCH (e.g., non-legacy user equipments) and wireless terminals 505B which monitor PDCCH (e.g., legacy user equipments) for downlink control data may not be able to receive downlink broadcast transmissions from a same PDSCH. Thus, some of the example embodiments presented herein are directed towards providing a wireless terminal, which monitors ePDCCH for downlink control information, an OFDM PDSCH start symbol which will enable both types of wireless terminals to receive the same downlink broadcasts transmissions.

According to some of the example embodiments, a wireless terminal 505A may monitor ePDCCH for obtaining downlink control information (operation 28). A base station 401 provides an OFDM PDSCH start symbol to the wireless terminal 505A (operation 10). This start symbol may be provided, for example, via a DCI or RRC message.

The wireless terminal 505A may thereafter obtain the OFDM PDSCH start symbol (operation 30). It should be appreciated that the OFDM PDSCH start symbol need not be transmitted by the base station 401. According to some of the example embodiments, the OFDM PDSCH start symbol may be based on a predefined value. In some example embodiments, this predefined value may be fixed or may depend on any number of network parameters. An example of such a parameter is a system bandwidth. Thus, there may be any number of predefined symbol values associated with different possible values of a system bandwidth. The wireless terminal 505A may retrieve such an OFDM PDSCH start symbol via, for example, a table or database.

Once the wireless terminal 505A has obtained the OFDM PDSCH start symbol, the wireless terminal 505A may begin to receive downlink broadcast transmissions on the PDSCH (operation 34). Some of the example embodiments may comprise the network indicating the OFDM PDSCH start symbol is the same as the start value configured in the PCFICH so that user equipments that may (e.g., legacy UEs) and user equipments that may not (e.g., non-legacy UEs) read the PCFICH can decode the same message. Thus, a wireless terminal 505B which is configured to read a PDCCH for downlink control information may obtain the OFDM PDSCH start symbol from the PDCCH. Therefore, both wireless terminals 505A and 505B may receive the same scheduled downlink broadcast transmissions (example operation 16).

The remainder of the text is organized as follows. Specific examples of how the OFDM PDSCH start symbol may be provided to a wireless terminal are provided under the subheadings 'Symbol Handling via DCI Messaging', 'Symbol Handling via RRC Messaging' and 'Fixed Symbol Values'. Example node configurations of a base station and wireless terminal are provided under the subheading 'Example Node Configurations'. Finally, example operations which may be taken by the base station and wireless terminal are provided under the subheading 'Example Node Operations'.

Symbol Handling Via DCI Messaging

Figure 14:
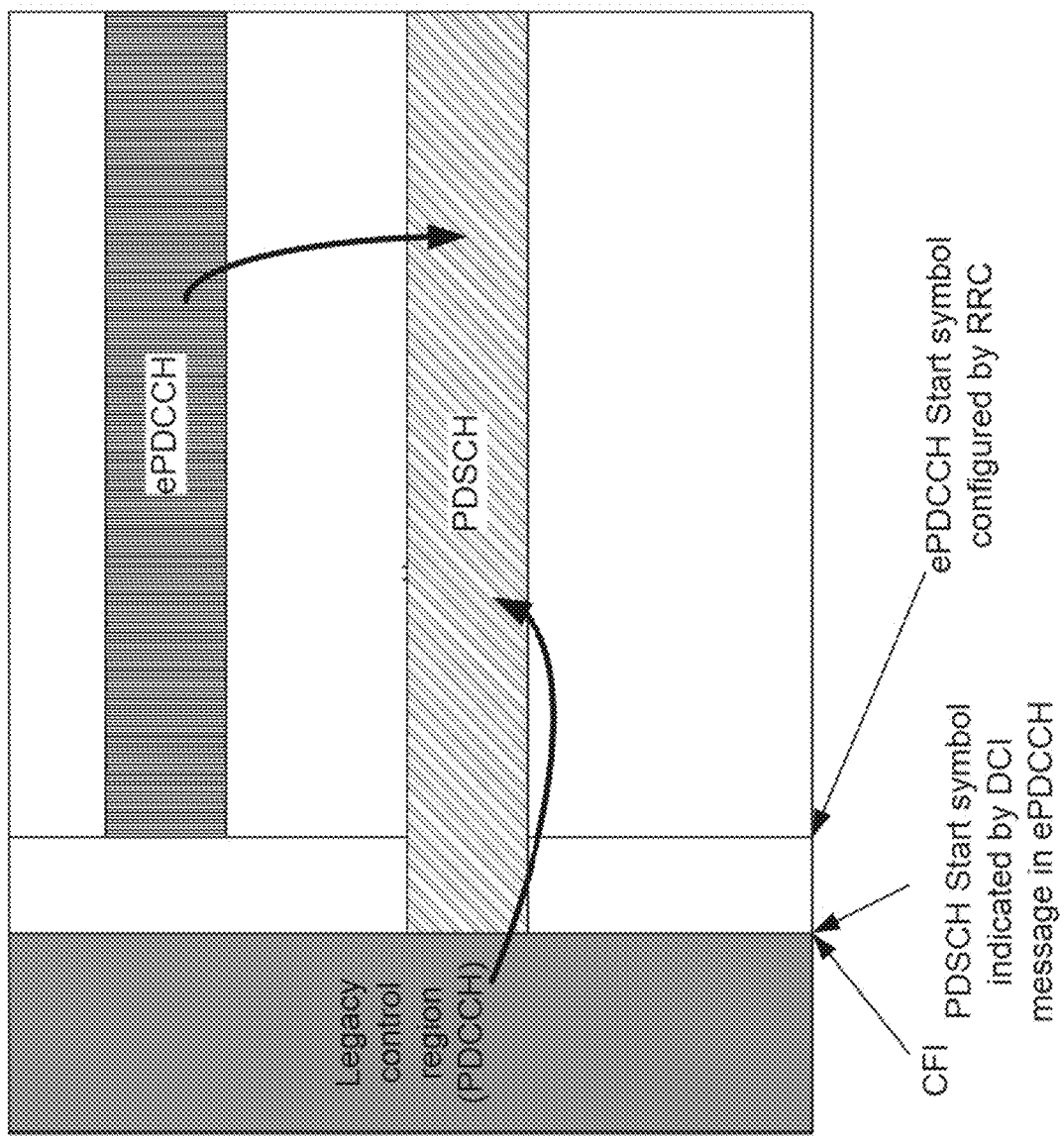
FIG. 14 is an illustrative example of PDSCH scheduling via a start symbol indicated in a DCI message in the ePDCCH, according to some of the example embodiments.

FIG. 14 illustrates providing an OFDM PDSCH start symbol via a DCI message provided in ePDCCH, according to some of the example embodiments. The OFDM PDSCH start symbol for the scheduled PDSCH transmission is indicated in the DCI message used to schedule the PDSCH transmission. This has the advantage that a dynamic start symbol which will minimize overhead may be used since the size of the legacy control region may always be adjusted to the required control channel capacity.

According to some of the example embodiments, the indication is performed in the DCI of the ePDCCH transmission by adding additional bits, such as one or two bits, or alternatively by re-using unused bits or code points of an existing DCI message. According to some of the example embodiments, the indication (or OFDM PDSCH start symbol) in the DCI message may comprise the same CFI (or start symbol supplied by the CFI) that is transmitted by PCFICH. In this way can both terminals (e.g., legacy and non-legacy), each that monitor one of CSS in PDCCH and ePDCCH, may receive the same message scheduled in PDSCH.

Such scheduled PDSCH could be a random access response, a transmission of a system information block (SIB), a paging, or any other channel introduced in the future that is of broadcast or unknown recipient nature. Such scheduled PDSCH could also be a normal shared data channel transmission where overhead may be reduced since the ePDCCH start symbol is RRC configured or configured by signaling in the PBCH or ePBCH (i.e., MIB) and thus semi-static, but the OFDM PDSCH start symbol may be dynamic by comprising the start symbol of the PDSCH in the DCI that schedules the PDSCH. For a LTE TDD system (frame structure 2) unused DAI bits may be reused for such indication of the OFDM start symbol in the DCI message.

Figure 15:
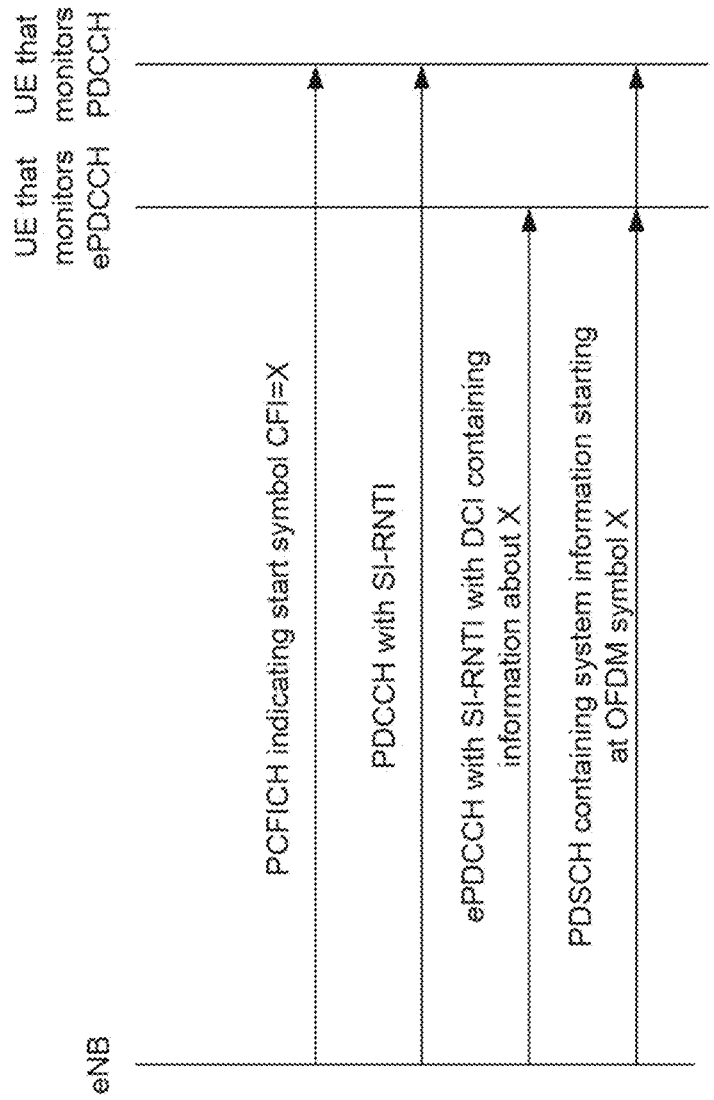
FIG. 15 is a messaging diagram depicting the scheduling of FIG. 14, according to some of the example embodiments.

FIG. 15 illustrates messaging for the signaling of the OFDM PDSCH start symbol as described in FIG. 14. First, the CFI start symbol for receiving downlink broadcast transmissions on the PDSCH is provided to a user equipment which monitors PDCCH (e.g., a legacy user equipment) via the PCFICH. In 3GPP release 10, such information may be provided to the user equipment, which monitors PDCCH, via SI-RNTI. A non-legacy user equipment which monitors ePDCCH may receive the OFDM PDSCH start symbol in a DCI message transmitted via ePDCCH. Thereafter, both the user equipment which monitors ePDCCH for downlink control information, as well as the user equipment which monitors the PDCCH, may receive same downlink broadcast transmissions starting at the provided start symbol.

Symbol Handling Via RRC Messaging

Figure 16:
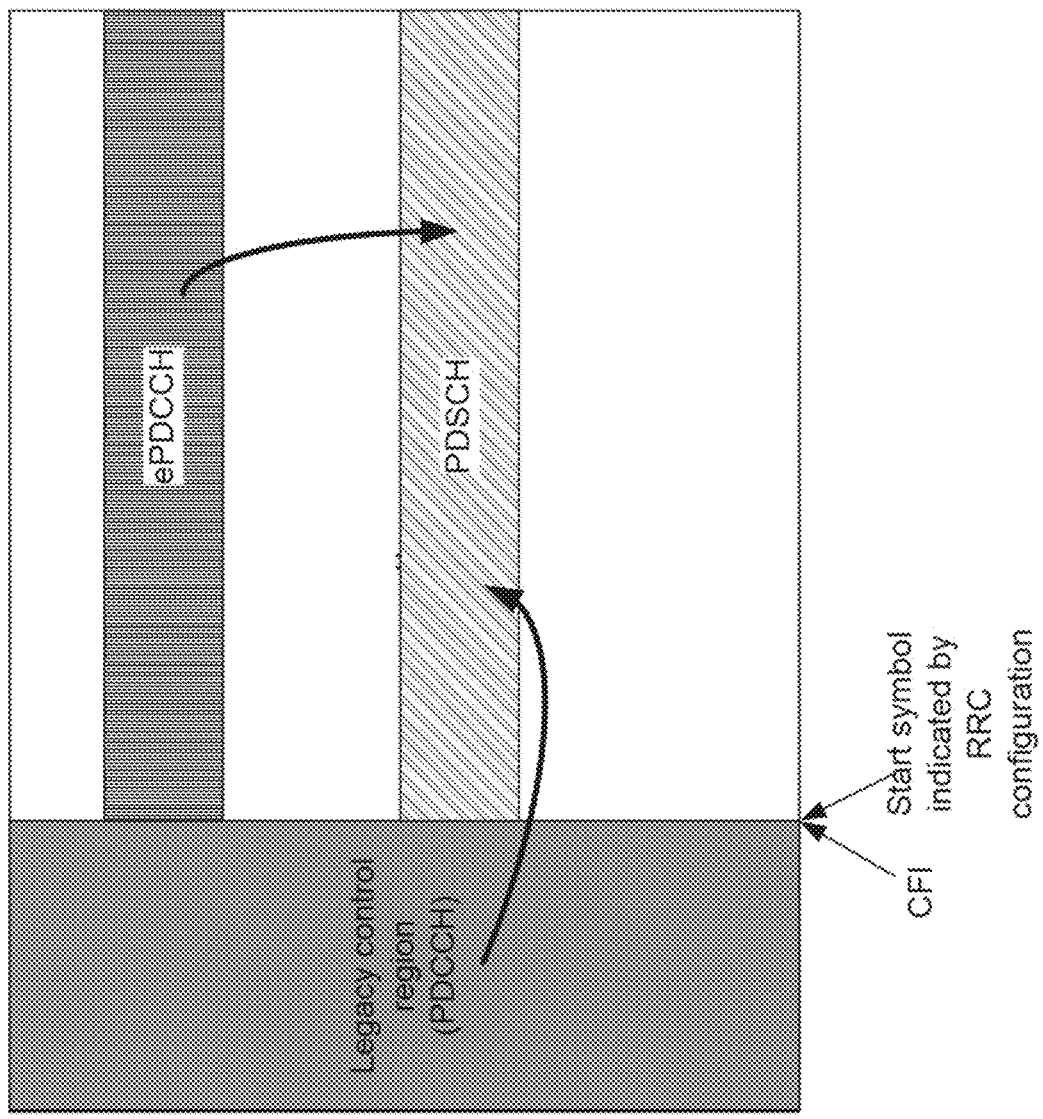
FIG. 16 is an illustrative example of PDSCH scheduling via a start symbol indicated in a RRC message, according to some of the example embodiments.

FIG. 16 illustrates providing an OFDM PDSCH start symbol via RRC messaging, according to some of the example embodiments. An first RRC configured value is used as the OFDM start symbol for PDSCH transmissions of system information, paging and random access responses. This RRC configured value may be different than a second RRC configured value used when scheduling a PDSCH transmission using ePDCCH or PDCCH via C-RNTI. The second RRC configured value, if used, determines the start position of PDSCH (when scheduled using C-RNTI) and may also indicate the start value for the ePDCCH. In this case, when detecting ePDCCH, the user equipment may use the second RRC configured value to detect the ePDCCH. Subsequently, if the ePDCCH comprises a scheduling of a broadcast message, it will use the first RRC configured value as the start value for the PDSCH comprising the broadcast message. The second value is the aligned among all user equipments that receive the broadcast message, while the first value could be any user equipment specifically RRC configured value.

According to some of the example embodiments, the user equipment may be configured with the OFDM start symbol by reading PBCH or ePBCH of the serving cell, or configured with the value from a RRC message transmitted within a SIB transmitted from the serving cell. According to some of the example embodiments, the user equipment may be configured to receive the OFDM PDSCH start symbol in a user equipment dedicated RRC message by the serving cell or in a handover command. It is further possible that the user equipment be configured with any number of options, in any combination, described herein.

According to some of the example embodiments, the CFI start value indicated in the PCFICH may be set to be equal to the first RRC configured value so that the same PDSCH start symbol may be assumed for user equipments that can or are configured to read the PCFICH and user equipments that rely on the RRC configured OFDM start symbol for receiving downlink broadcast transmissions the PDSCH.

Figure 17:
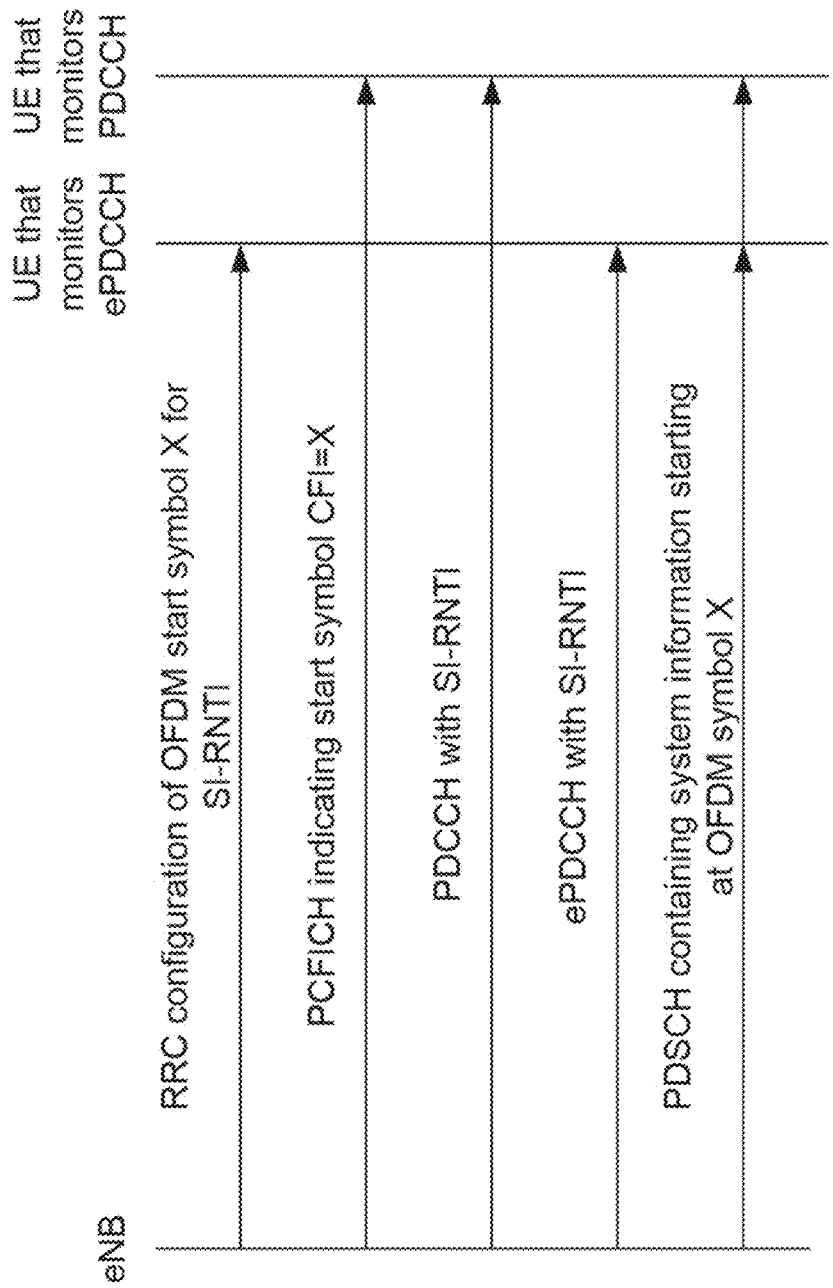
FIG. 17 is a messaging diagram depicting the scheduling of FIG. 16, according to some of the example embodiments.

FIG. 17 illustrates a messaging diagram for providing the OFDM PDSCH start symbol via RRC messaging. As illustrated, user equipments which monitor ePDCCH may obtain the OFDM PDSCH start symbol via PDSCH or ePDCCH. User equipments which monitor PDCCH for downlink control data may receive the start symbol via a CFI in PCFICH or via PDCCH with SI-RNTI. Thereafter, both user equipments may obtain the same downlink broadcast transmission data via the PDSCH.

Fixed Symbol Values

According to some of the example embodiments, the OFDM PDSCH start symbol may be a fixed value. The OFDM start symbol for system information, random access or paging transmissions may be pre-defined in the standard specifications to be either n=0,1,2,3 or 4. According to some of the example embodiments, the OFDM PDSCH start symbol may also be related to the maximum size of the legacy control region, which may be 0, 2, 3 or 4. According to some of the example embodiments, the OFDM PDSCH start symbol may be a pre-configured value based on a system bandwidth or any other system parameters. Thus, there may be a number of pre-configured OFDM PDSCH start symbol values where each value may be associated with a respective system parameter. In such an instance, the wireless terminal may retrieve the OFDM PDSCH start symbol provided by the base station. For instance, the system bandwidth may be used to determine the start value and the system bandwidth is signaled in the MIB. So when user equipment detects the MIB, it may derive the start symbol value used for broadcast transmissions in the cell.

Example Node Configurations

Figure 18:
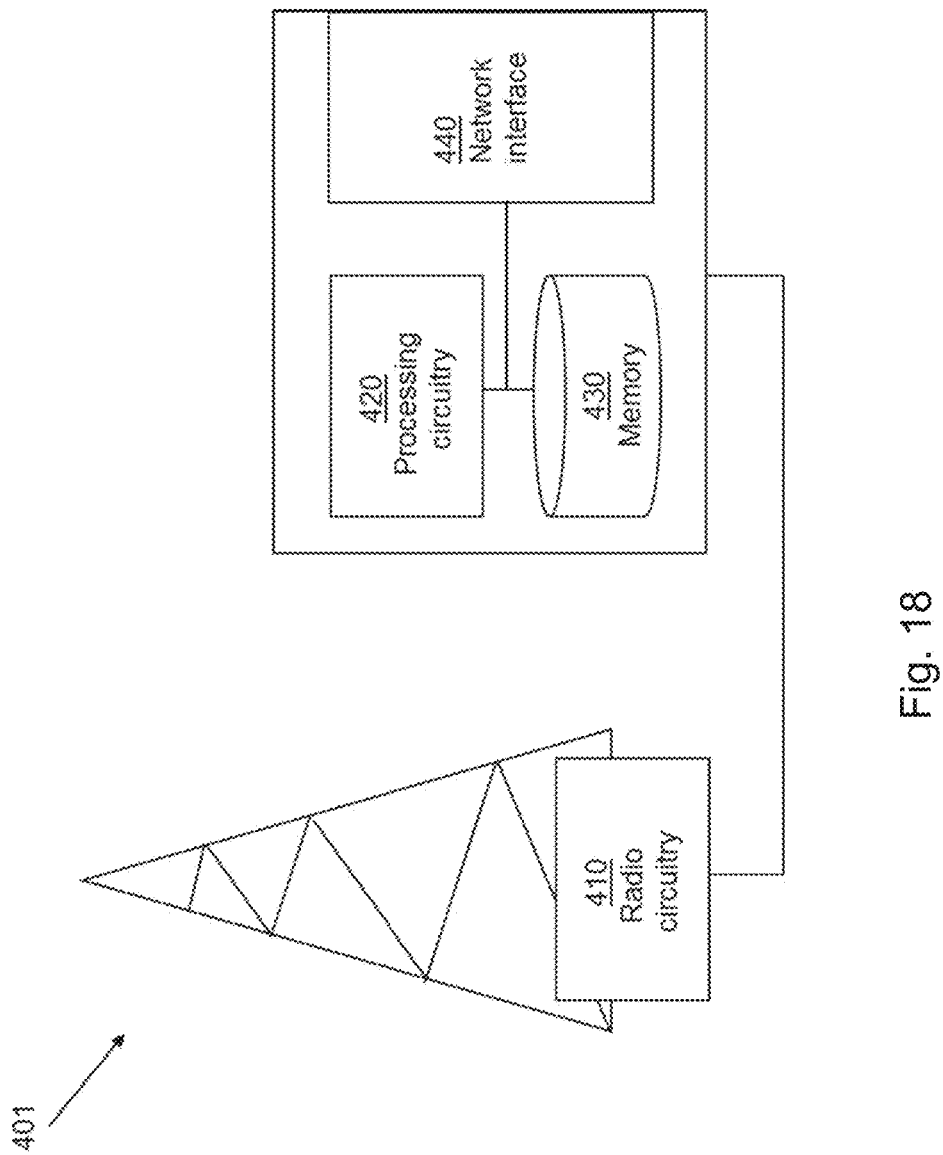
FIG. 18 is an example node configuration of a base station, according to some of the example embodiments.

FIG. 18 illustrates an example node configuration of a base station or eNB 401 which may perform some of the example embodiments described herein. The base station 401 may comprise radio circuitry or a communication port 410 that may be configured to receive and/or transmit communication data, instructions, and/or messages. It should be appreciated that the radio circuitry or communication port 410 may be comprised as any number of transceiving, receiving, and/or transmitting units or circuitry. It should further be appreciated that the radio circuitry or communication port 410 may be in the form of any input or output communications port known in the art. The radio circuitry or communication port 410 may comprise RF circuitry and baseband processing circuitry (not shown).

The base station 401 may also comprise a processing unit or circuitry 420 which may be configured to provide scheduling for a downlink broadcast transmission based on an OFDM PDSCH start symbol and also be configured to provide such a symbol to a wireless terminal. The processing circuitry 420 may be any suitable type of computation unit, for example, a microprocessor, digital signal processor (DSP), field programmable gate array (FPGA), or application specific integrated circuit (ASIC), or any other form of circuitry. The base station 401 may further comprise a memory unit or circuitry 430 which may be any suitable type of computer readable memory and may be of volatile and/or non-volatile type. The memory 430 may be configured to store received, transmitted, and/or measured data, device parameters, communication priorities, and/or executable program instructions.

Figure 19:
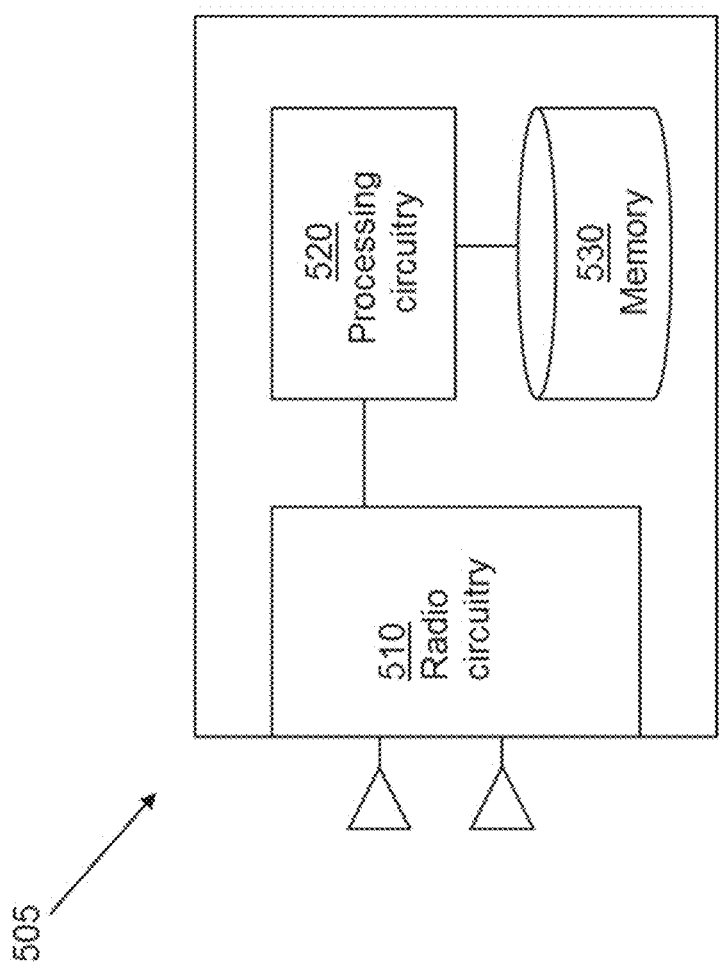
FIG. 19 is an example node configuration of a wireless terminal or user equipment, according to some of the example embodiments.

FIG. 19 illustrates an example node configuration of a wireless terminal 505 which may perform some of the example embodiments described herein. It should be appreciated that the wireless terminal 505 may be a user equipment, machine-to-machine type device, or any other device capable of communicating with a communications network. The wireless terminal 505 may comprise radio circuitry or a communication port 510 that may be configured to receive and/or transmit communication data, instructions, and/or messages. It should be appreciated that the radio circuitry or communication port 510 may be comprised as any number of transceiving, receiving, and/or transmitting units or circuitry. It should further be appreciated that the radio circuitry or communication port 510 may be in the form of any input or output communications port known in the art. The radio circuitry or communication port 510 may comprise RF circuitry and baseband processing circuitry (not shown).

The wireless terminal 505 may also comprise a processing unit or circuitry 520 which may be configured to obtain downlink broadcast transmission on PDSCH using a received OFDM PDSCH symbol as described herein. The processing circuitry 520 may be any suitable type of computation unit, for example, a microprocessor, digital signal processor (DSP), field programmable gate array (FPGA), or application specific integrated circuit (ASIC), or any other form of circuitry. The wireless terminal 505 may further comprise a memory unit or circuitry 530 which may be any suitable type of computer readable memory and may be of volatile and/or non-volatile type. The memory 530 may be configured to store received, transmitted, and/or measured data, device parameters, communication priorities, and/or executable program instructions.

Example Node Operations

Figure 20:
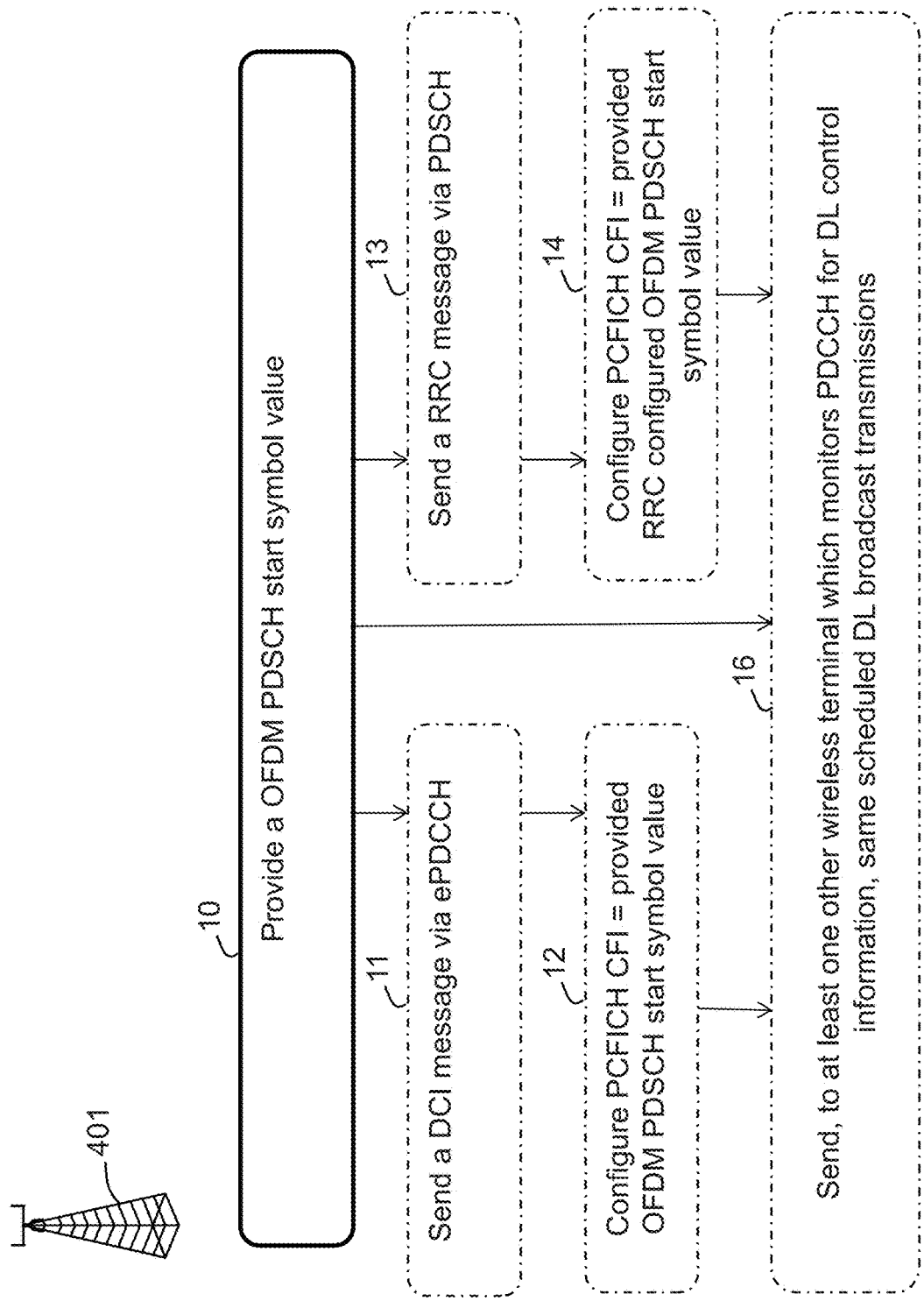
FIG. 20 is a flow diagram illustrating example operations which may be taken by the base station of FIG. 18, according to some of the example embodiments.

FIG. 20 is a flow diagram depicting example operations which may be taken by the base station 401 as described herein for scheduling downlink broadcast transmissions using an OFDM PDSCH start symbol and for providing such a symbol. It should also be appreciated that FIG. 20 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

Operation 10

The base station 401 is configured to provide 10, to at least one wireless terminal 505A that monitors an ePDCCH for receiving downlink control information, an OFDM PDSCH start symbol. The OFDM PDSCH start symbol assists in identifying a start of downlink broadcast transmissions provided on the PDSCH. The processing circuitry 420 is configured to provide the OFDM PDSCH start symbol to the at least one wireless terminal 505A that monitors the ePDCCH for receiving downlink control information.

According to some of the example embodiments, the OFDM PDSCH start symbol may be provided via a message transmitted outside of a control region of a subframe, where the control region may comprise at least a PDCCH. This control region is sometimes referred to as a legacy control region. It should be appreciated that the control region may comprise zero symbols. In such an instance, the OFDM PDSCH start symbol may comprise a value of zero. Examples of such a control region provided at least in FIGS. 12, 14 and 16.

According to some of the example embodiments, the OFDM PDSCH start symbol may be based on a predefined value. Thus, the OFDM PDSCH start symbol may be a fixed value. According to some of the example embodiments, the OFDM PDSCH start symbol may depend on any number of system parameters, for example, a system bandwidth. Therefore, different predefined values may be associated with respective system bandwidth values. Such a fixed value may be provided by the base station and retrieved by the wireless terminal via, for example, a table or database.

According to some of the example embodiments, the provided OFDM PDSCH start symbol is of a same value as the CFI via PCFICH.

Example Operation 11

According to some of the example embodiments, the OFDM PDSCH start symbol may be provided by sending 11 a DCI message via the ePDCCH. The radio circuitry 410 may be configured to send the DCI message via the ePDCCH. Examples of providing the OFDM PDSCH start symbol via DCI messaging is described further under at least the subheadings 'Overview of Example Embodiments' and 'Symbol Handling via DCI Messaging'.

Example Operation 12

According to some of the example embodiments, the base station 401 may configure 12 a PCFICH CFI value in a subframe, in which downlink broadcast transmissions are sent, to be equal to the OFDM PDSCH start symbol. The processing circuitry 420 may configured the PCFICH CFI value in the subframe, in which the downlink broadcast transmissions are sent, to be equal to the OFDM PDSCH start symbol.

The PCFICH CFI is obtained by wireless terminals 505B which monitor PDCCH for obtaining downlink control information. Thus, by configuring the PCFICH CFI to be equal to the OFDM PDSCH provided via the DCI message, both wireless terminals 505A and 505B may receive the same downlink broadcast transmissions via the same PDSCH.

Example Operation 13

According to some of the example embodiments, the base station 401 may send 13 a RRC message comprising the OFDM PDSCH start symbol via PDSCH. In this example embodiment, the OFDM PDSCH start symbol is an RRC configured value. The radio circuitry 410 may be configured to send the RRC message via PDSCH. Examples of providing the OFDM PDSCH start symbol via the RRC message is described further under at least the subheadings 'Overview of Example Embodiments' and 'Symbol Handling via RRC Messaging'.

Example Operation 14

According to some of the example embodiments, the base station 401 may configure 14 a PCFICH CFI value in a subframe, in which downlink broadcast transmissions are sent, to be equal to the OFDM PDSCH start symbol. The processing circuitry 420 may configure the PCFICH CFI value in the subframe, in which the downlink broadcast transmissions are sent, to be equal to the OFDM PDSCH start symbol.

The PCFICH CFI is obtained by wireless terminals 505B which monitor PDCCH for obtaining downlink control information. Thus, by configuring the PCFICH CFI to be equal to the RRC configured OFDM PDSCH provided via the RRC message, both wireless terminals 505A and 505B may receive the same downlink broadcast transmissions via the same PDSCH.

Example Operation 16

According to some of the example embodiments, the base station 401 may also be configured to send 16, to at least one other wireless terminal 505B which monitors the PDCCH for receiving downlink control information, same downlink broadcast transmissions scheduled in the PDSCH. The radio circuitry 410 is configured to send, to the at least one other wireless terminal 505B which monitors the PDCCH for receiving downlink control information, the same downlink broadcast transmissions scheduled in the PDSCH.

Thus, as explained previously in FIGS. 12 and 13, wireless terminals 505A and 505B may monitor different control channels, and therefore may receive different start values. The receipt of different start values may result in different wireless terminals (e.g., wireless terminals 505A and 505B) receiving different downlink broadcast transmissions via different PDSCHs. With the aid of the example embodiments presented herein, wireless terminals which monitor different control channels may now receive the same downlink broadcast transmissions via the same PDSCH via the transmission of the OFDM PDSCH start symbol.

Figure 21:
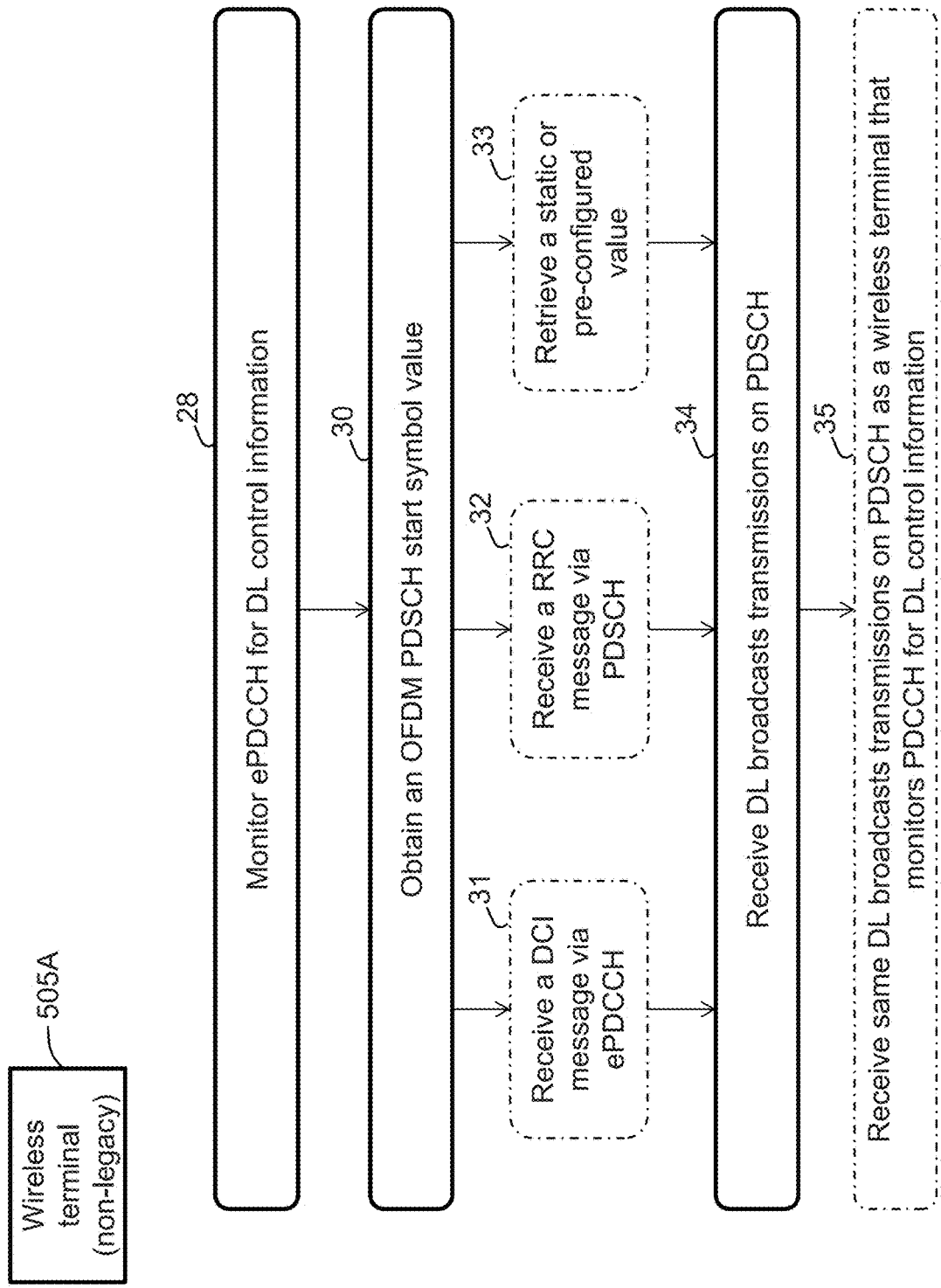
FIG. 21 is a flow diagram illustrating example operations which may be taken by the user equipment of FIG. 19, according to some of the example embodiments.

FIG. 21 is a flow diagram depicting example operations which may be taken by the wireless terminal 505A as described herein for receiving downlink broadcast transmissions via a PDSCH. It should also be appreciated that FIG. 21 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination.

Operation 28

The wireless terminal 505A is configured to monitor 28 an ePDCCH for downlink control information. The processing circuitry 520 is configured to monitor the ePDCCH for the downlink control information. An example of such downlink control information is a start symbol for reading downlink broadcast transmissions.

Operation 30

The wireless terminal 505A is also configured to obtain 30 an OFDM PDSCH start symbol. The OFDM PDSCH start symbol may be used for identifying a start in the downlink broadcast transmissions. The processing circuitry 520 is configured to obtain the OFDM PDSCH start symbol.

According to some of the example embodiments, the OFDM PDSCH start symbol may be obtained via a message transmitted outside of a control region of a subframe, where the control region may comprise at least a PDCCH. This control region is sometimes referred to as a legacy control region. It should be appreciated that the control region may comprise zero symbols. In such an instance, the OFDM PDSCH start symbol may comprise a value of zero. Examples of such a control region provided at least in FIGS. 12, 14 and 16.

According to some of the example embodiments, the OFDM PDSCH start symbol may be based on a predefined value. Thus, the OFDM PDSCH start symbol may be a fixed value. According to some of the example embodiments, the OFDM PDSCH start symbol may depend on any number of system parameters, for example, a system bandwidth. Therefore, different predefined values may be associated with respective system bandwidth values. Such a fixe value may be provided by the base station and retrieved by the wireless terminal via, for example, a table or database or via broadcast transmissions.

According to some of the example embodiments, the provided OFDM PDSCH start symbol is of a same value as the CFI via PCFICH.

Example Operation 31

According to some of the example embodiments, the message may be a DCI message and the obtaining 30 may further comprise receiving 31, from a network node, the DCI message via the ePDCCH. The radio circuitry 510 may be configured to receive, from the network node, the DCI message via ePDCCH. It should be appreciated that the network node may be the base station 401 or a rely node comprised in the network. Examples of receiving the OFDM PDSCH start symbol via DCI messaging is described further under at least the subheadings 'Overview of Example Embodiments' and 'Symbol Handling via DCI Messaging'.

Example Operation 32

According to some of the example embodiments, the message may be a RRC message and the obtaining 30 may further comprise receiving 32, from a network node, the RRC message via the PDSCH. The radio circuitry 510 may be configured to receive, from the network node, the RRC message via PDSCH. It should be appreciated that the network node may be the base station 401 or a relay node comprised in the network. It should also be appreciated that in these example embodiments, the OFDM PDSCH start symbol may be a RRC configured value. Examples of receiving the OFDM PDSCH start symbol via RRC messaging is described further under at least the subheadings 'Overview of Example Embodiments' and 'Symbol Handling via RRC Messaging'.

Example Operation 33

According to some of the example embodiments, the obtaining may further comprise retrieving 33 the OFDM PDSCH start symbol based on a static value or a pre-configured value based on a system bandwidth. The processing circuitry 520 may be configured to retrieve the OFDM PDSCH start symbol based on the static value or the pre-configured value based on the system bandwidth.

As described above, in at least example operation 30, the pre-configured value may be based on a single fixed value or any number of different predefined values. Different predefined values may be associated with respective system bandwidth values. Such a fixe value may be provided by the base station and retrieved by the wireless terminal via, for example, a table or database.

Operation 34

The wireless terminal 505A is also configured to receive 34 downlink broadcast transmissions on the PDSCH based on the OFDM PDSCH start symbol. The radio circuitry 510 is configured to receive the downlink broadcast transmissions on the PDSCH based on the OFDM PDSCH start symbol.

Example Operation 35

According to some of the example embodiments, the receiving 34 may further comprise receiving 35 same downlink broadcast transmissions on the PDSCH as a wireless terminal 505B which monitors the PDCCH for receiving downlink control information. The radio circuitry 510 is configured to receive same downlink broadcast transmissions on the PDSCH as the wireless terminal 505B which monitors the PDCCH for receiving downlink control information.

Thus, as explained previously in FIGS. 12 and 13, wireless terminals 505A and 505B may monitor different control channels, and therefore may receive different start values. The receipt of different start values may result in different wireless terminals (e.g., wireless terminals 505A and 505B) receiving different downlink broadcast transmissions via different PDSCHs. With the aid of the example embodiments presented herein, wireless terminals which monitor different control channels may now receive the same downlink broadcast transmissions via the same PDSCH.

General Statements

It should be noted that although terminology from 3GPP LTE has been used herein to explain the example embodiments, this should not be seen as limiting the scope of the example embodiments to only the aforementioned system. Other wireless systems, comprising WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

ABBREVIATIONS

ACK Acknowledgement
ARQ Automatic Repeat Request
C-RNTI Cell-RNTI
CA Carrier Aggregation
CIF Carrier Indicator Field
CAZAC Constant Amplitude Zero Auto Correlation
CC Component Carrier
CCE Control Channel Element
CFI Control Format Indicator
CRC Cyclic Redundancy Check
CRS Common Reference Symbol
CSS Common Search Space
DCI Downlink Control Information
DFT Discrete Fourier Transform
DL Downlink
eNB eNodeB
ePBCH Evolved PBCH
ePDCCH Enhanced PDCCH
eREG Enhanced Resource Element Group HARQ Hybrid Automatic Repeat Request
ICIC Inter-Cell Interference Coordination
LTE Long Term Evolution
MAC Medium Access Control
MIB Master Information Block
MIMO Multiple-Input Multiple-Output
MSG Message
MTC Machine Type Communication
NACK Non Acknowledgement
OFDM Orthogonal Frequency Division Multiple Access
P-RNTI Paging-RNTI
PBCH Physical Broadcast Channel
PCC Primary Component Carrier
PCFICH Physical Control Format Indicator Channel
PDCCH Physical Downlink Control Channel
PDSCH Physical Downlink Shared Channel
PF3 PUCCH Format 3
PHICH Physical Hybrid ARQ Indicator Channel
PRACH Physical Random Access Channel
PRB Physical Resource Block
PUCCH Physical Uplink Control Channel
PUSCH Physical Uplink Shared Channel
RA Random Access
RAN Radio Access Network
RAR Random Access Response
RB Resource Block
RNTI Radio Network Temporary Identifier
RRC Radio Resource Control
RSRP Reference Signal Received Power
RSRQ Reference Signal Received Quality
SCC Secondary Component Carrier
SI-RNTI System Information-RNTI
SIB System Information Block
TA Time Alignment
TC-RNTI Temporary C-RNTI
TDD Time Division Duplex
TPC Transmit Power Control
UE User equipment
UL Uplink
USS User Specific Search Space

The invention claimed is:

1. A method in a base station for scheduling a downlink broadcast transmission using a Physical Downlink Shared Channel (PDSCH) wherein an Orthogonal Frequency Division Multiplexing (OFDM) PDSCH start symbol identifier is used for identifying a start of said broadcast transmission, said base station being comprised in a wireless communications network, the method comprising:
selecting an OFDM PDSCH start symbol for the start of the broadcast transmission,
wherein the OFDM PDSCH start symbol is based only on a system bandwidth.

2. The method of claim 1, wherein the OFDM PDSCH start symbol is one of a number of predefined values and the value is selected based on the system bandwidth.

3. The method of claim 1, where a size of a control region is zero symbols and the OFDM PDSCH start symbol is zero.

4. The method of claim 1, further comprising configuring a Physical Control Format Indicator Channel (PCFICH) control format indicator (CFI) value, in a subframe in which downlink broadcast transmissions are sent, to be equal to the selected OFDM PDSCH start symbol.

5. The method of claim 4, further comprising configuring a Physical Control Format Indicator Channel (PCFICH) control format indicator (CFI) value, in a subframe in which downlink broadcast transmissions are sent, to be equal to the OFDM PDSCH start symbol, wherein the OFDM PDSCH start symbol is a radio resource control (RRC) configured value.

6. The method of claim 1, further comprising transmitting the downlink broadcast transmission, the downlink broadcast transmission including a second OFDM start symbol identifying the start of a PDSCH region for connected mode signaling and/or an enhanced Physical Downlink Control Channel (ePDCCH) region.

7. The method of claim 6, further comprising transmitting, to the at least a first user equipment, an ePDCCH, based on the second OFDM start symbol.

8. A base station for scheduling a downlink broadcast transmission using a Physical Downlink Shared Channel (PDSCH) wherein an Orthogonal Frequency Division Multiplexing (OFDM) PDSCH start symbol is used for identifying a start of said broadcast transmission, said base station being comprised in a wireless communications network, the base station comprising:
radio circuitry configured to transmit the broadcast transmission; and
processing circuitry configured to control the radio circuitry and to select an OFDM PDSCH start symbol for the start of the broadcast transmission, wherein the OFDM PDSCH start symbol is based only on a system bandwidth.

9. The base station of claim 8, wherein the OFDM PDSCH start symbol is one of a number of predefined values and the value is selected based on the system bandwidth.

10. The base station of claim 8, where a size of a control region is zero symbols and the OFDM PDSCH start symbol is zero.

11. The base station of claim 8, further comprising configuring a Physical Control Format Indicator Channel (PCFICH) control format indicator (CFI) value, in a subframe in which downlink broadcast transmissions are sent, to be equal to the selected OFDM PDSCH start symbol.

12. The base station of claim 11, wherein the processing circuit is configured to configure a Physical Control Format Indicator Channel (PCFICH) control format indicator (CFI) value, in a subframe in which downlink broadcast transmissions are sent, to be equal to the OFDM PDSCH start symbol, wherein the OFDM PDSCH start symbol is a radio resource control (RRC) configured value.

13. The base station of claim 8, wherein the processing circuit is configured to control the radio circuitry to transmit the downlink broadcast transmission, the downlink broadcast transmission including a second OFDM start symbol identifying the start of a PDSCH region for connected mode signaling and/or an enhanced Physical Downlink Control Channel (ePDCCH) region.

14. The base station of claim 13, wherein the processing circuit is configured to control the radio circuitry to transmit, to the at least a first user equipment, an ePDCCH, based on the second OFDM start symbol.

15. A method in a wireless terminal for receiving downlink broadcast transmissions in a Physical Downlink Shared Channel (PDSCH) said wireless terminal being comprised in a wireless communications network, the method comprising:
monitoring an enhanced Physical Downlink Control Channel (ePDCCH) for downlink control information;
determining an Orthogonal Frequency Division Multiplexing (OFDM) PDSCH start symbol for a start of the downlink broadcast transmissions, wherein said OFDM PDSCH start symbol is based only on a system bandwidth.

16. The method of claim 15, wherein the start symbol for the start of the downlink broadcast transmission is one of a number of values, and the value is determined based on the system bandwidth.

17. The method of claim 15, where a size of a control region is zero symbols and the OFDM PDSCH start symbol is zero.

18. The method of claim 15, wherein the method further comprises receiving the downlink broadcast transmission, the downlink broadcast transmission including a second OFDM start symbol identifying the start of a PDSCH region for connected mode signaling and/or an enhanced Physical Downlink Control Channel (ePDCCH) region.

19. The method of claim 18, wherein the method further comprises receiving an ePDCCH, based on the second OFDM PDSCH start symbol.

20. A wireless terminal for receiving downlink broadcast transmissions in a Physical Downlink Shared Channel (PDSCH), the wireless terminal comprising:
radio circuitry configured to receive downlink broadcast transmissions on the PDSCH;
processing circuitry configured to control the radio circuitry to monitor an enhanced Physical Downlink Control Channel (ePDCCH) for downlink control information, to determine an Orthogonal Frequency Division Multiplexing (OFDM) PDSCH start symbol for identifying a start of said downlink broadcast transmissions, wherein said OFDM PDSCH start symbol is based only on a system bandwidth, and to control the radio circuitry to receive downlink broadcast transmissions based on the OFDM PDSCH start symbol.

21. The wireless terminal of claim 20, wherein the start symbol for the start of the downlink broadcast transmission is one of a number of values, and the value is determined based on the system bandwidth.

22. The wireless terminal of claim 20, where a size of a control region is zero symbols and the OFDM PDSCH start symbol is zero.

23. The wireless terminal of claim 20, wherein the processing circuitry is configured to receive the downlink broadcast transmission, the downlink broadcast transmission including a second OFDM start symbol identifying the start of a PDSCH region for connected mode signaling and/or an enhanced Physical Downlink Control Channel (ePDCCH) region.

24. The wireless terminal of claim 23, wherein the processing circuitry is configured to receive an ePDCCH, based on the second OFDM start symbol.

25. The method of claim 1, further comprising transmitting the downlink broadcast transmission to a reduced bandwidth wireless terminal.

* * * * *